United States Patent
Chen et al.

(10) Patent No.: US 12,250,411 B2
(45) Date of Patent: Mar. 11, 2025

(54) METHODS AND APPARATUSES FOR SIGNALING OF SYNTAX ELEMENTS IN VIDEO CODING

(71) Applicant: BEIJING DAJIA INTERNET INFORMATION TECHNOLOGY CO., LTD., Beijing (CN)

(72) Inventors: Yi-Wen Chen, San Diego, CA (US); Xiaoyu Xiu, San Diego, CA (US); Tsung-Chuan Ma, San Diego, CA (US); Hong-Jheng Jhu, San Diego, CA (US); Wei Chen, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 129 days.

(21) Appl. No.: 17/959,479

(22) Filed: Oct. 4, 2022

(65) Prior Publication Data
US 2023/0040224 A1 Feb. 9, 2023

Related U.S. Application Data

(63) Continuation of application No. PCT/US2021/026271, filed on Apr. 7, 2021.
(Continued)

(51) Int. Cl.
*H04N 19/70* (2014.01)
*H04N 19/105* (2014.01)
(Continued)

(52) U.S. Cl.
CPC .......... *H04N 19/70* (2014.11); *H04N 19/105* (2014.11); *H04N 19/139* (2014.11);
(Continued)

(58) Field of Classification Search
CPC .... H04N 19/70; H04N 19/105; H04N 19/139; H04N 19/172; H04N 19/174;
(Continued)

(56) References Cited

U.S. PATENT DOCUMENTS

| 2013/0272406 A1 | 10/2013 | Yu et al. |
| 2019/0132606 A1 | 5/2019 | Su et al. |
| 2022/0286667 A1* | 9/2022 | Lu ........................ H04N 19/70 |

FOREIGN PATENT DOCUMENTS

| CN | 104937939 A | 9/2015 |
| CN | 110572669 A | 12/2019 |

(Continued)

OTHER PUBLICATIONS

Extended European Search Report of EP Application No. 21784676.5 dated Jul. 26, 2023, (3p).
(Continued)

*Primary Examiner* — Joseph W Becker
(74) *Attorney, Agent, or Firm* — Arch & Lake LLP

(57) ABSTRACT

Methods and apparatuses for video coding are provided. The method includes that a decoder determines whether a disable flag is present in a picture header (PH) associated with a picture, wherein the disable flag specifies whether a coding tool is disabled in one or more slices associated with the PH. Additionally, the method includes that the decoder infers value of the disable flag according to one or more enable flags signaled in a sequence parameter set (SPS) of the picture in response to determining that the disable flag is not present in the PH, inferring, by the decoder.

20 Claims, 6 Drawing Sheets

--- determining whether a disable flag is present in a picture header (PH) associated with a picture and the disable flag specifies whether a coding tool is disabled in one or more slices associated with the PH     602 inferring value of the disable flag according to one or more enable flags signaled in SPS of the picture in response to determining that the disable flag is not present in the PH
604

Related U.S. Application Data

(60) Provisional application No. 63/015,663, filed on Apr. 26, 2020, provisional application No. 63/010,619, filed on Apr. 15, 2020, provisional application No. 63/010,005, filed on Apr. 14, 2020, provisional application No. 63/009,404, filed on Apr. 13, 2020, provisional application No. 63/007,355, filed on Apr. 8, 2020.

(51) Int. Cl.
*H04N 19/139* (2014.01)
*H04N 19/172* (2014.01)
*H04N 19/174* (2014.01)
*H04N 19/52* (2014.01)
*H04N 19/577* (2014.01)

(52) U.S. Cl.
CPC ......... *H04N 19/172* (2014.11); *H04N 19/174* (2014.11); *H04N 19/52* (2014.11); *H04N 19/577* (2014.11)

(58) Field of Classification Search
CPC ...... H04N 19/52; H04N 19/577; H04N 19/42; H04N 19/523
See application file for complete search history.

(56) References Cited

FOREIGN PATENT DOCUMENTS

| | | |
|---|---|---|
| CN | 110719464 A | 1/2020 |
| CN | 110896486 A | 3/2020 |
| EP | 1545134 A2 | 6/2005 |
| JP | 2017515339 A | 6/2017 |
| KR | 20150036599 A | 4/2015 |
| KR | 20180120200 A | 11/2018 |
| WO | 2010134973 A1 | 11/2010 |
| WO | 2017201011 A1 | 11/2017 |
| WO | 2019194502 A1 | 10/2019 |
| WO | 2020003260 A1 | 1/2020 |

OTHER PUBLICATIONS

EP Search Report of EP Application No. 21784676.5 dated Aug. 7, 2023 (6p).

Pettersson, Martin et al., "AHG9: On B-slice signaling in the PH and derivation of slice_type", Joint Video Experts Team (JVET) of ITU-T SG 16 WP 3 and ISO/IEC JTC 1/SC 29/WG 11, Document: JVET-R0250, 18th Meeting by teleconference, Apr. 15-24, 2020, (5p).

International Search Report in Application No. PCT/US2021/026271 dated Jul. 19, 2021(4p).

Yi-Wen Chen et al, Kwai Inc., "AHG9: On TMVP enabling flag in picture header" Joint Video Experts Team (JVET) of ITU-T SG 16 WP 3 and ISO/IEC JTC 1/SC 29/WG 11, JVET-R0323, 18th Meeting, by teleconference, Apr. 15-24, 2020,(2p).

Benjamin Bross et al., "Versatile Video Coding (Draft 8)" Joint Video Experts Team (JVET) of ITU-T SG 16 WP 3 and ISO/IEC JTC 1/SC 29/WG 11, JVET-Q2001-vE, 17th Meeting, Brussels, BE, Jan. 7-17, 2020,(512p).

Yi-Wen Chen et al, Kwai Inc., "AHG9: On syntax signaling conditions in picture header" Joint Video Experts Team (JVET) of ITU-T SG 16 WP 3 and ISO/IEC JTC 1/SC 29/WG 11, JVET-R0324, 18th Meeting, by teleconference, Apr. 15-24, 2020,(2p).

Jack Enhorn et al, Ericsson, "AHG9: Reduce redundant signaling in picture header" Joint Video Experts Team (JVET) of ITU-T SG 16 WP 3 and ISO/IEC JTC 1/SC 29/WG 11, JVET-R0258, 18th Meeting, by teleconference, Apr. 15-24, 2020,(5p).

First Examination Report of Application No. 202217063504 issued by the Indian Patent Office on Apr. 13, 2023, (7p).

\* cited by examiner

SPLIT_BT_VER

SPLIT_BT_HOR

SPLIT_TT_VER

SPLIT_TT_HOR determining whether a disable flag is present in a picture header (PH) associated with a picture and the disable flag specifies whether a coding tool is disabled in one or more slices associated with the PH    602

inferring value of the disable flag according to one or more enable flags signaled in SPS of the picture in response to determining that the disable flag is not present in the PH

604

FIG. 6 determining whether a flag is present in a picture header (PH) associated with a picture and the flag specifies whether the picture used for TMVP is derived from a reference picture list from a plurality of reference picture lists associated with the picture    702

inferring value of the flag according to a number of reference pictures in the reference picture list in response to determining that the flag is not present in the PH

704

FIG. 7 determining whether a flag is present in a picture header (PH) associated with a picture and the flag specifies a number of weights signaled in a reference picture list according to a first WP flag in PPS of the picture and a second WP flag in the PH of the picture and the flag is in a WP syntax associated with the picture
802 inferring value of the flag according to a number of reference pictures in the reference picture list in response to determining that the flag is not present in the PH
804

FIG. 8 using an enabled flag to specify whether one or more temporal motion vector predictors used for inter prediction for one or more slices associated with a picture header (PH) of a picture
902 constraining value of the enabled flag according to a plurality of offsets applied to a size of the picture for scaling ratio calculation
904

FIG. 9

METHODS AND APPARATUSES FOR SIGNALING OF SYNTAX ELEMENTS IN VIDEO CODING

CROSS-REFERENCE TO RELATED APPLICATIONS

This application is a continuation application of International Application No. PCT/US2021/026271 filed on Apr. 7, 2021, which is based upon and claims priority to U.S. Provisional Application No. 63/007,355 filed on Apr. 8, 2020, U.S. Provisional Application No. 63/009,404 filed on Apr. 13, 2020, U.S. Provisional Application No. 63/010,005 filed on Apr. 14, 2020, U.S. Provisional Application No. 60/010,619 filed on Apr. 15, 2020, and U.S. Provisional Application No. 63/015,663 filed on Apr. 26, 2020, the entire disclosures of which are incorporated herein by reference in their entireties for all purposes.

FIELD

The present disclosure relates to video coding and compression, and in particular but not limited to, methods and apparatuses for signaling of syntax elements in video coding.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

SUMMARY

The present disclosure provides examples of techniques relating to signaling of syntax elements in video coding.

According to a first aspect of the present disclosure, there is provided a method for video coding. The method includes that a decoder determines whether a disable flag is present in a picture header (PH) associated with a picture, wherein the disable flag specifies whether a coding tool is disabled in one or more slices associated with the PH. Additionally, the method includes that the decoder infers value of the disable flag according to one or more enable flags signaled in a sequence parameter set (SPS) of the picture in response to determining that the disable flag is not present in the PH.

According to a second aspect of the present disclosure, there is provided a method for video coding. The method includes that a decoder determines whether a flag is present in a PH associated with a picture and the flag specifies whether the picture used for temporal motion vector prediction (TMVP) is derived from a reference picture list from a plurality of reference picture lists associated with the picture. Additionally, the method includes that the decoder infers value of the flag according to a number of reference pictures in the reference picture list in response to determining that the flag is not present in the PH.

According to a third aspect of the present disclosure, there is provided a method for video coding. The method includes that a decoder determines whether a flag is present in a PH associated with a picture, the flag specifies a number of weights signaled in a reference picture list according to a first weighted prediction (WP) flag in a PPS of the picture and a second WP flag in the PH of the picture, and the flag is in a WP syntax associated with the picture. Additionally, the method includes that the decoder infers value of the flag according to a number of reference pictures in a reference picture list from a plurality of reference picture lists associated with the picture in response to determining that the flag is not present in the PH.

According to a fourth aspect of the present disclosure, there is provided a method for video coding. The method includes that a decoder uses an enabled flag to specify whether one or more temporal motion vector predictors used for inter prediction for one or more slices associated with a PH of a picture. Additionally, the method includes that the decoder constrains value of the enabled flag according to a plurality of offsets applied to a size of the picture for scaling ratio calculation.

According to a fifth aspect of the present disclosure, there is provided an apparatus for video coding. The apparatus includes one or more processors and a memory configured to store instructions executable by the one or more processors. The one or more processors, upon execution of the instructions, are configured to perform the method for video coding according to the first aspect of the present disclosure.

According to a sixth aspect of the present disclosure, there is provided an apparatus for video coding. The apparatus includes one or more processors and a memory configured to store instructions executable by the one or more processors. The one or more processors, upon execution of the instructions, are configured to perform the method for video coding according to the second aspect of the present disclosure.

According to a seventh aspect of the present disclosure, there is provided an apparatus for video coding. The apparatus includes one or more processors and a memory configured to store instructions executable by the one or more processors. The one or more processors, upon execution of the instructions, are configured to perform the method for video coding according to the third aspect of the present disclosure.

According to an eighth aspect of the present disclosure, there is provided an apparatus for video coding. The apparatus includes one or more processors and a memory configured to store instructions executable by the one or more processors. The one or more processors, upon execution of the instructions, are configured to perform the method for video coding according to the fourth aspect of the present disclosure.

According to a ninth aspect of the present disclosure, there is provided a non-transitory computer readable storage medium for video coding storing computer-executable instructions. The instructions, when executed by one or more computer processors, causing the one or more computer processors to perform the method for video coding according to the first aspect of the present disclosure.

According to a tenth aspect of the present disclosure, there is provided a non-transitory computer readable storage medium for video coding storing computer-executable instructions. The instructions, when executed by one or more computer processors, causing the one or more computer processors to perform the method for video coding according to the second aspect of the present disclosure.

According to an eleventh aspect of the present disclosure, there is provided a non-transitory computer readable storage medium for video coding storing computer-executable instructions. The instructions, when executed by one or more computer processors, causing the one or more computer processors to perform the method for video coding according to the third aspect of the present disclosure.

According to a twelfth aspect of the present disclosure, there is provided a non-transitory computer readable storage medium for video coding storing computer-executable instructions. The instructions, when executed by one or more computer processors, causing the one or more computer processors to perform the method for video coding according to the fourth aspect of the present disclosure.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 6 is a flowchart illustrating an exemplary process of video coding in accordance with some implementations of the present disclosure.

FIG. 7 is a flowchart illustrating an exemplary process of video coding in accordance with some implementations of the present disclosure.

FIG. 8 is a flowchart illustrating an exemplary process of video coding in accordance with some implementations of the present disclosure.

FIG. 9 is a flowchart illustrating an exemplary process of video coding in accordance with some implementations of the present disclosure.

DETAILED DESCRIPTION

Figure 1:
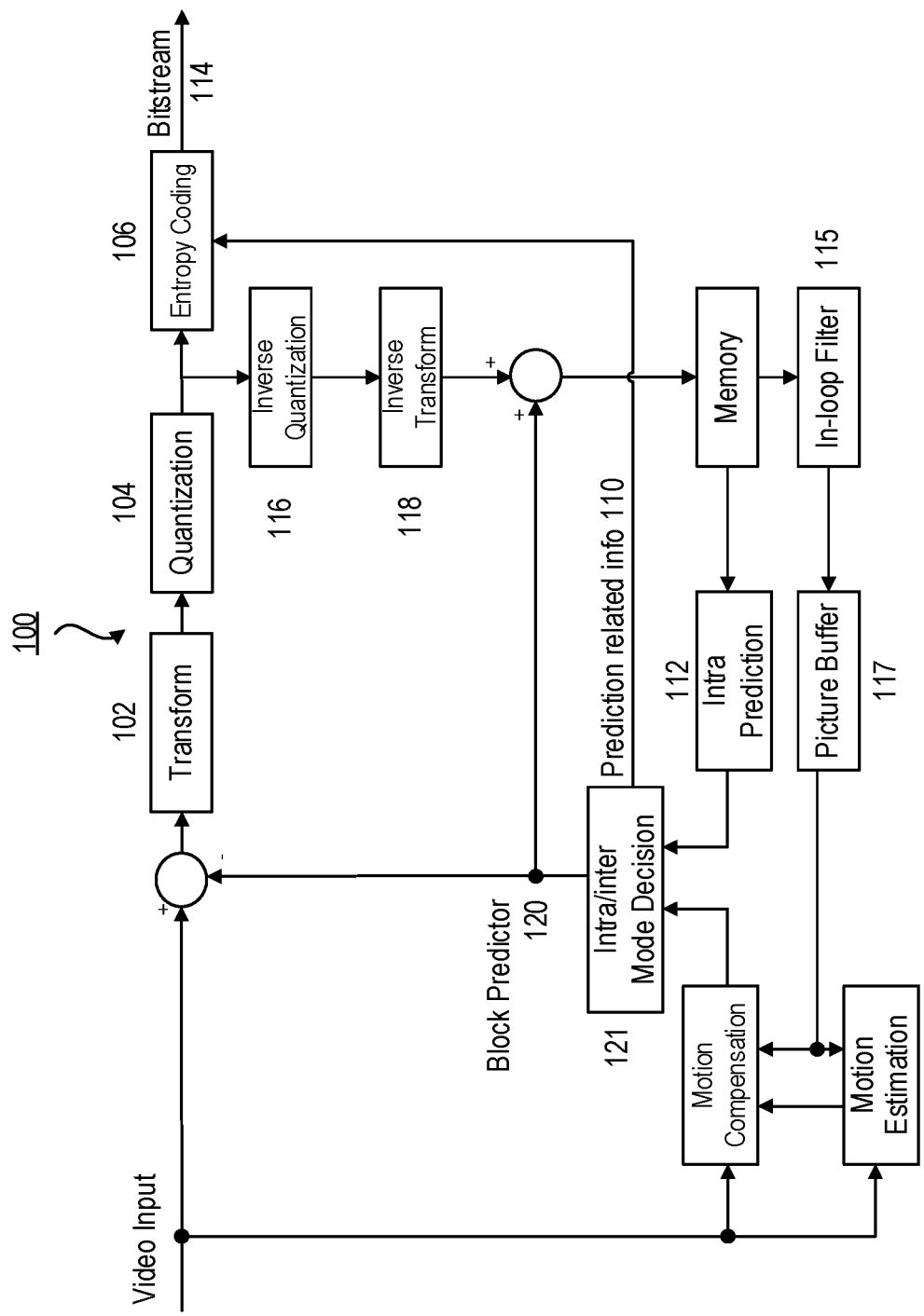
FIG. 1 is a block diagram illustrating an exemplary video encoder in accordance with some implementations of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," and etc. are all used as nomenclature only for references to relevant elements, e.g. devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 shows a block diagram of illustrating an exemplary block-based hybrid video encoder 100 which may be used in conjunction with many video coding standards using block-based processing. In the encoder 100, a video frame is partitioned into a plurality of video blocks for processing. For each given video block, a prediction is formed based on either an inter prediction approach or an intra prediction approach. In inter prediction, one or more predictors are formed through motion estimation and motion compensation, based on pixels from previously reconstructed frames. In intra prediction, predictors are formed based on reconstructed pixels in a current frame. Through mode decision, a best predictor may be chosen to predict a current block.

A prediction residual, representing the difference between a current video block and its predictor, is sent to a Transform circuitry 102. Transform coefficients are then sent from the Transform circuitry 102 to a Quantization circuitry 104 for entropy reduction. Quantized coefficients are then fed to an Entropy Coding circuitry 106 to generate a compressed video bitstream. As shown in FIG. 1, prediction-related information 110 from an inter prediction circuitry and/or an Intra Prediction circuitry 112, such as video block partition info, motion vectors, reference picture index, and intra prediction mode, are also fed through the Entropy Coding circuitry 106 and saved into a compressed video bitstream 114.

In the encoder 100, decoder-related circuitries are also needed in order to reconstruct pixels for the purpose of prediction. First, a prediction residual is reconstructed through an Inverse Quantization 116 and an Inverse Transform circuitry 118. This reconstructed prediction residual is combined with a Block Predictor 120 to generate un-filtered reconstructed pixels for a current video block.

Intra prediction (also referred to as "spatial prediction") uses pixels from the samples of already coded neighboring blocks (which are called reference samples) in the same video picture and/or slice to predict the current video block. Spatial prediction reduces spatial redundancy inherent in the video signal.

Inter prediction (also referred to as "temporal prediction") uses reconstructed pixels from already-coded video pictures to predict the current video block. Temporal prediction reduces temporal redundancy inherent in the video signal. Temporal prediction signal for a given coding unit (CU) or coding block is usually signaled by one or more motion vectors (MVs) which indicate the amount and the direction of motion between the current CU and its temporal reference. Further, if multiple reference pictures are supported, one reference picture index is additionally sent, which is used to identify from which reference picture in the reference picture store the temporal prediction signal comes.

After spatial and/or temporal prediction is performed, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU. Further, in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

For example, a deblocking filter is available in AVC, HEVC as well as the now-current version of VVC. In HEVC, an additional in-loop filter called SAO (sample adaptive offset) is defined to further improve coding efficiency. In the now-current version of the VVC standard, yet another in-loop filter called ALF (adaptive loop filter) is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 2:
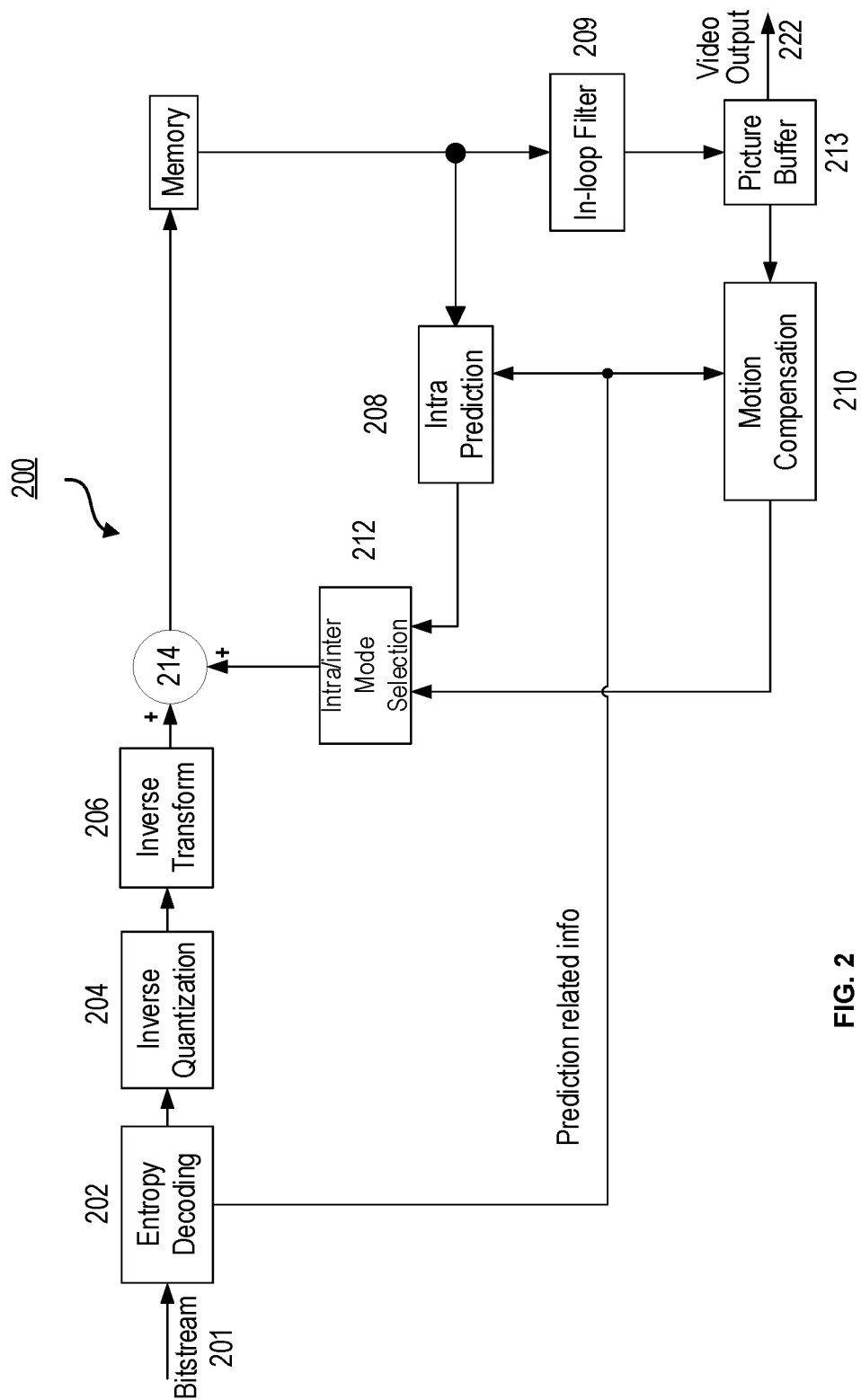
FIG. 2 is a block diagram illustrating an exemplary video decoder in accordance with some implementations of the present disclosure.

FIG. 2 is a block diagram illustrating an exemplary block-based video decoder 200 which may be used in conjunction with many video coding standards. This decoder 200 is similar to the reconstruction-related section residing in the encoder 100 of FIG. 1. In the decoder 200, an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214.

The reconstructed block may further go through an In-Loop Filter 209 before it is stored in a Picture Buffer 213 which functions as a reference picture store. The reconstructed video in the Picture Buffer 213 may be sent to drive a display device, as well as used to predict future video blocks. In situations where the In-Loop Filter 209 is turned on, a filtering operation is performed on these reconstructed pixels to derive a final reconstructed Video Output 222.

Video coding/decoding standards mentioned above, such as VVC, JEM, HEVC, MPEG-4, Part 10, are conceptually similar. For example, they all use block-based processing. Block partitioning schemes in some standards are elaborated below.

Versatile Video Coding (VVC)

At the 10th JVET meeting, held APR. 10-20, 2018, San Diego, US, JVET defined the first draft of Versatile Video Coding (VVC) and the VVC Test Model 1 (VTM1) as its reference software implementation. It was decided to include a quadtree with a nested multi-type tree as the initial new coding feature of VVC. The multi-type tree is a coding block partition structure including both binary and ternary split. Since then the reference software VTM, with both encoding and decoding process implemented, has been developed and updated through the following JVET meetings.

In VVC, a picture of an input video is partitioned into blocks called CTUs. A CTU is split into CUs using a quadtree with a nested multi-type tree structure, with a CU defining a region of pixels sharing the same prediction mode (e.g. intra or inter). The term 'unit' may define a region of an image covering all components such as luma and chroma. The term 'block' may be used to define a region covering a particular component (e.g. luma), and the blocks of different components (e.g. luma vs. chroma) may differ in spatial location when considering the chroma sampling format such as 4:2:0.

Partitioning of the Picture into CTUs

Figure 3:
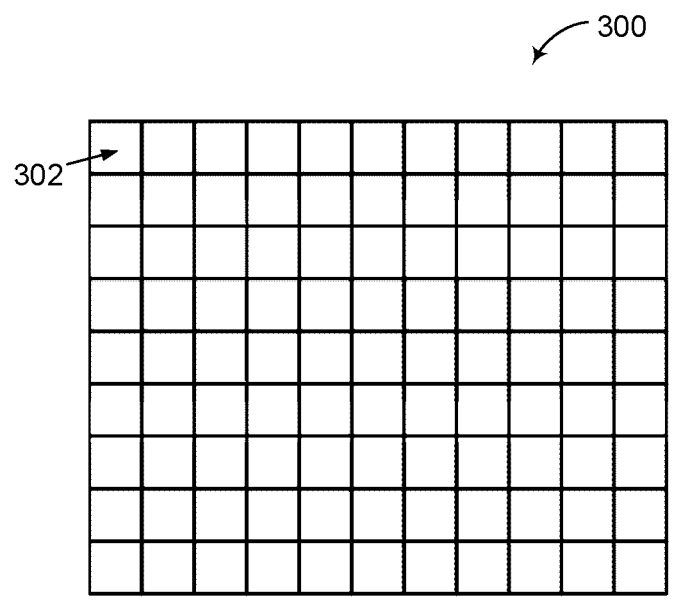
FIG. 3 illustrates an example of a picture divided into multiple coding tree units (CTUs) in accordance with some implementations of the present disclosure.
Figure 4A:
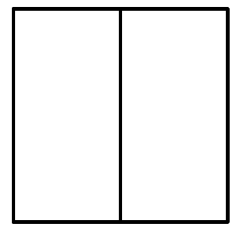
FIGS. 4A-4D are schematic diagrams illustrating multi-type tree splitting modes in accordance with some implementations of the present disclosure.
Figure 4B:
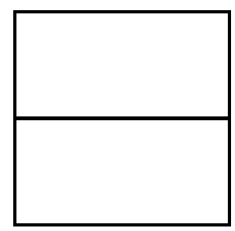
Figure 4C:
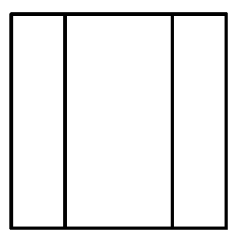
Figure 4D:
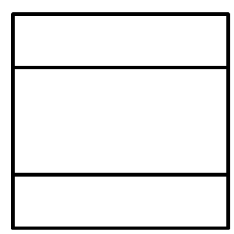

FIG. 3 illustrates an example of a picture 300 divided into multiple CTUs 302 in accordance with some implementations of the present disclosure.

Pictures are divided into a sequence of CTUs. The CTU concept is same to that of the HEVC. For a picture that has three sample arrays, a CTU consists of an N×N block of luma samples together with two corresponding blocks of chroma samples.

The maximum allowed size of the luma block in a CTU is specified to be 128×128 (although the maximum size of the luma transform blocks is 64×64).

Partitioning of the CTUs Using a Tree Structure

In HEVC, a CTU is split into CUs by using a quaternary-tree structure denoted as coding tree to adapt to various local characteristics. The decision whether to code a picture area using inter-picture (temporal) or intra-picture (spatial) prediction is made at the leaf CU level. Each leaf CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One of key feature of the HEVC structure is that it has the multiple partition conceptions including CU, PU, and TU.

In VVC, a quadtree with nested multi-type tree using binary and ternary splits segmentation structure replaces the concepts of multiple partition unit types, i.e. it removes the separation of the CU, PU and TU concepts except as needed for CUs that have a size too large for the maximum transform length, and supports more flexibility for CU partition shapes. In the coding tree structure, a CU can have either a square or rectangular shape. A CTU is first partitioned by a quaternary tree (a.k.a. quadtree) structure. Then the quaternary tree leaf nodes can be further partitioned by a multi-type tree structure.

FIGS. 4A-4D are schematic diagrams illustrating multi-type tree splitting modes in accordance with some implementations of the present disclosure. As shown in FIGS. 4A-4D, there are four splitting types in multi-type tree structure, vertical binary splitting 402 (SPLIT_BT_VER), horizontal binary splitting 404 (SPLIT_BT_HOR), vertical ternary splitting 406 (SPLIT_TT_VER), and horizontal ternary splitting 408 (SPLIT_TT_HOR). The multi-type tree leaf nodes are called CUs, and unless the CU is too large for the maximum transform length, this segmentation is used for prediction and transform processing without any further partitioning. This means that, in most cases, the CU, PU, and TU have the same block size in the quadtree with nested multi-type tree coding block structure. The exception occurs when maximum supported transform length is smaller than the width or height of the colour component of the CU.

Syntax in VVC

In VVC, the first layer of bitstream of syntax signaling is the Network Abstraction Layer (NAL) where the bitstream is divided into a set of NAL units. Some NAL units signal common control parameters to the decoder, such as the Sequence Parameter Sets (SPS) and Picture Parameter Sets (PPS). Others contain video data. The Video Coding Layer (VCL) NAL units contain slices of coded video. A coded picture is called an access unit and can be encoded as one or more slices.

A coded video sequence starts with an Instantaneous Decoder Refresh (IDR) picture. All following video pictures are coded as slices. A new IDR picture signals that the previous video segment is ended, and a new one begins. Each NAL unit begins with a one-byte header followed by the Raw Byte Sequence Payload (RBSP). The RBSP contains encoded slices. Slices are binary coded, so they may be padded with zero bits to ensure that the length is an integer number of bytes. A slice consists of a slice header and slice data. Slice data are specified as a series of CUs.

The PH concept was adopted in the 16th WET meeting to be transmitted once per picture as the first VCL NAL unit of a picture. It was also proposed to group some syntax elements previously in the slice header to this picture header. Syntax elements that functionally only need to be transmitted once per picture could be moved to the picture header instead of being transmitted multiple times in slices for a given picture.

In the VVC specification, the syntax tables specify a superset of the syntax of all allowed bitstreams. Additional constraints on the syntax may be specified, either directly or indirectly, in other clauses. Table 1 below is a syntax table of the slice header and picture header in VVC. The semantics of some syntax are also illustrated after the syntax table.

TABLE 1

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) \|\| | |
|     ( !rect_slice_flag && NumTilesInPic > 1 ) ) | |
|     slice_address | u(v) |
|   for( i = 0; i < NumExtraShBits; i++ ) | |
|     sh_extra_bit[ i ] | u(1) |
|   if( !rect_slice_flag && NumTilesInPic > 1 ) | |
|     num_tiles_in_slice_minus1 | ue(v) |
|   if( ph_inter_slice_allowed_flag ) | |
|     slice_type | ue(v) |
|   if( sps_alf_enabled_flag && !alf_info_in_ph_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |
|       if( sps_cc_alf_enabled_flag ) { | |
|         slice_cc_alf_cb_enabled_flag | u(1) |
|         if( slice_cc_alf_cb_enabled_flag ) | |
|           slice_cc_alf_cb_aps_id | u(3) |
|         slice_cc_alf_cr_enabled_flag | u(1) |
|         if( slice_cc_alf_cr_enabled_flag) | |

TABLE 1-continued

| | Descriptor |
|---|---|
| ``slice_cc_alf_cr_aps_id`` | u(3) |

```
      }
    }
  }
  if( separate_colour_plane_flag = = 1 )
    colour_plane_id                                                          u(2)
  if( !rpl_info_in_ph_flag && (( nal_unit_type != IDR_W_RADL &&
nal_unit_type !=
      IDR_N_LP ) || sps_idr_rpl_present_flag))
    ref_pic_lists( )
  if( ( rpl_info_in_ph_flag || ( ( nal_unit_type != IDR_W_RADL &&
nal_unit_type !=
      IDR_N_LP ) || sps_idr_rpl_present_flag ) ) &&
      ( ( slice_type != I && num_ref_entries[ 0 ][ RplsIdx[ 0 ] ] > 1 )
      ( slice_type = = B && num_ref_entries[ 1 ][ RplsIdx[ 1 ] ] > 1 ) ) ) {
    num_ref_idx_active_override_flag                                         u(1)
    if( num_ref_idx_active_override_flag )
      for( i = 0; i < ( slice_type = = B ? 2: 1 ); i++ )
        if( num_ref_entries[ i ][ RplsIdx[ i ] ] > 1 )
          num_ref_idx_active_minus1 [ i ]                                    ue(v)
  }
  if( slice_type != I) {
    if( cabac_init_present_flag )
      cabac_init_flag                                                        u(1)
    if( ph_temporal_mvp_enabled_flag && !rpl_info_in_ph_flag ) {
      if( slice_type = = B )
        slice_collocated_from_l0_flag                                        u(1)
      if( ( slice_collocated_from_l0_flag && NumRefIdxActive 0 ] > 1 )
          ( ! slice_collocated_from_l0_flag && NumRefIdxActive[ 1 ] > 1 ) )
        slice_collocated_ref_idx                                             ue(v)
    }
    if( !wp_info_in_ph_flag && ( ( pps_weighted_pred_flag && slice_type = = P
) ||
        ( pps_weighted_bipred_flag && slice_type = = B ) ) )
      pred_weight_table( )
  }
  if( !qp_delta_info_in_ph_flag )
    slice_qp_delta                                                           se(v)
  if( pps_slice_chroma_qp_offsets_present_flag ) {
    slice_cb_qp_offset                                                       se(v)
    slice_cr_qp_offset                                                       se(v)
    if( sps_joint_cbcr_enabled_flag )
      slice_joint_cbcr_qp_offset                                             se(v)
  }
  if( pps_cu_chroma_qp_offset_list_enabled_flag )
    cu_chroma_qp_offset_enabled_flag                                         u(1)
  if( sps_sao_enabled_flag && !sao_info_in_ph_flag ) {
    slice_sao_luma_flag                                                      u(1)
    if( ChromaArrayType != 0 )
      slice_sao_chroma_flag                                                  u(1)
  }
  if( deblocking_filter_override_enabled_flag && !dbf_info_in_ph_flag )
    slice_deblocking_filter_override_flag                                    u(1)
  if( slice_deblocking_filter_override_flag ) {
    slice_deblocking_filter_disabled_flag                                    u(1)
    if( !slice_deblocking_filter_disabled_flag ) {
      slice_beta_offset_div2                                                 se(v)
      slice_tc_offset_div2                                                   se(v)
      slice_cb_beta_offset_div2                                              se(v)
      slice_cb_tc_offset_div2                                                se(v)
      slice_cr_beta_offset_div2                                              se(v)
      slice_cr_tc_offset_div2                                                se(v)
    }
  }
  slice_ts_residual_coding_disabled_flag                                     u(1)
  if( ph_lmcs_enabled_flag )
    slice_lmcs_enabled_flag                                                  u(1)
  if( ph_explicit_scaling_list_enabled_flag )
    slice_explicit_scaling_list_used_flag                                    u(1)
  if( NumEntryPoints > 0 ) {
    offset_len_minus1                                                        ue(v)
    for( i = 0; i < NumEntryPoints; i++ )
      entry_point_offset_minus1[ i ]                                         u(v)
  }
  if( slice_header_extension_present_flag ) {
    slice_header_extension_length                                            ue(v)
    for( i = 0; i < slice_header_extension_length; i++ )
      slice_header_extension_data_byte[ i ]                                  u(8)
```

TABLE 1-continued

| | Descriptor |
|---|---|
| } | |
|   byte_alignment( ) | |
| } | |
| picture_header_structure( ) { | |
|   gdr_or_irap_pic_flag | u(1) |
|   if( gdr_or_irap_pic_flag ) | |
|     gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   non_reference_picture_flag | u(1) |
|   ph_pic_parameter_set_id | ue(v) |
|   ph_pic_order_cnt_lsb | u(v) |
|   if( gdr_or_irap_pic_flag ) | |
|     no_output_of_prior_pics_flag | u(1) |
|   if( gdr_pic_flag) | |
|     recovery_poc_cnt | ue(v) |
|   for( i = 0; i < NumExtraPhBits; i++ ) | |
|     ph_extra_bit[ i ] | u(1) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   if( sps_alf_enabled_flag && alf_info_in_ph_flag ) { | |
|     ph_alf_enabled_flag | u(1) |
|     if( ph_alf_enabled_flag ) { | |
|       ph_num_alf_aps_ids_luma | u(3) |
|       for( i = 0; i < ph_num_alf_aps_ids_luma; i++ ) | |
|         ph_alf_aps_id_luma[ i ] | u(3) |
|       if( ChromaArrayType != 0 ) | |
|         ph_alf_chroma_idc | u(2) |
|       if( ph_alf_chroma_idc > 0 ) | |
|         ph_alf_aps_id_chroma | u(3) |
|       if( sps_ccalf_enabled_flag ) { | |
|         ph_cc_alf_cb_enabled_flag | u(1) |
|         if( ph_cc_alf_cb_enabled_flag ) | |
|           ph_cc_alf_cb_aps_id | u(3) |
|         ph_cc_alf_cr_enabled_flag | u(1) |
|         if( ph_cc_alf_cr_enabled_flag ) | |
|           ph_cc_alf_cr_aps_id | u(3) |
|       } | |
|     } | |
|   } | |
|   if( sps_lmcs_enabled_flag ) { | |
|     ph_lmcs_enabled_flag | u(1) |
|     if( ph_lmcs_enabled_flag ) { | |
|       ph_lmcs_aps_id | u(2) |
|       if( ChromaArrayType != 0) | |
|         ph_chroma_residual_scale_flag | u(1) |
|     } | |
|   } | |
|   if( sps_explicit_scaling_list_enabled_flag ) { | |
|     ph_explicit_scaling_list_enabled_flag | u(1) |
|     if( ph_explicit_scaling_list_enabled_flag ) | |
|       ph_scaling_list_aps_id | u(3) |
|   } | |
|   if( sps_virtual_boundaries_enabled_flag && !sps_virtual_boundaries_present_flag ) { | |
|     ph_virtual_boundaries_present_flag | u(1) |
|     if( ph_virtual_boundaries_present_flag ) { | |
|       ph_num_ver_virtual_boundaries | u(2) |
|       for( i = 0; i < ph_num_ver_virtual_boundaries; i++ ) | |
|         ph_virtual_boundaries_pos_x[ i ] | u(13) |
|       ph_num_hor_virtual_boundaries | u(2) |
|       for( i = 0; i < ph_num_hor_virtual_boundaries; i++ ) | |
|         ph_virtual_boundaries_pos_y[ i ] | u(13) |
|     } | |
|   } | |
|   if( output_flag_present_flag ) | |
|     pic_output_flag | u(1) |
|   if( rpl_info_in_ph_flag) | |
|     ref_pic_lists( ) | |
|   if( partition_constraints_override_enabled_flag ) | |
|     partition_constraints_override_flag | u(1) |
|   if( ph_intra_slice_allowed_flag ) { | |
|     if( partition_constraints_override_flag ) { | |
|       ph_log2_diff_min_qt_min_cb_intra_slice_luma | ue(v) |
|       ph_max_mtt_hierarchy_depth_intra_slice_luma | ue(v) |

TABLE 1-continued

| | Descriptor |
|---|---|
|     if( ph_max_mtt_hierarchy_depth_intra_slice_luma != 0 ) { | |
|       ph_log2_diff_max_bt_min_qt_intra_slice_luma | ue(v) |
|       ph_log2_diff_max_tt_min_qt_intra_slice_luma | ue(v) |
|     } | |
|     if( qtbtt_dual_tree_intra_flag ) { | |
|       ph_log2_diff_min_qt_min_cb_intra_slice_chroma | ue(v) |
|       ph_max_mtt_hierarchy_depth_intra_slice_chroma | ue(v) |
|       if( ph_max_mtt_hierarchy_depth_intra_slice_chroma != 0 ) { | |
|         ph_log2_diff_max_bt_min_qt_intra_slice_chroma | ue(v) |
|         ph_log2_diff_max_tt_min_qt_intra_slice_chroma | ue(v) |
|       } | |
|     } | |
|   } | |
|   if( cu_qp_delta_enabled_flag ) | |
|     ph_cu_qp_delta_subdiv_intra_slice | ue(v) |
|   if( pps_cu_chroma_qp_offset_list_enabled_flag ) | |
|     ph_cu_chroma_qp_offset_subdiv_intra_slice | ue(v) |
| } | |
| if( ph_inter_slice_allowed_flag ) { | |
|   if( partition_constraints_override_flag ) { | |
|     ph_log2_diff_min_qt_min_cb_inter_slice | ue(v) |
|     ph_max_mtt_hierarchy_depth_inter_slice | ue(v) |
|     if( ph_max_mtt_hierarchy_depth_inter_slice != 0 ) { | |
|       ph_log2_diff_max_bt_min_qt_inter_slice | ue(v) |
|       ph_log2_diff_max_tt_min_qt_inter_slice | ue(v) |
|     } | |
|   } | |
|   if( cu_qp_delta_enabled_flag ) | |
|     ph_cu_qp_delta_subdiv_inter_slice | ue(v) |
|   if( pps_cu_chroma_qp_offset_list_enabled_flag ) | |
|     ph_cu_chroma_qp_offset_subdiv_inter_slice | ue(v) |
|   if( sps_temporal_mvp_enabled_flag ) { | |
|     ph_temporal_mvp_enabled_flag | u(1) |
|     if( ph_temporal_mvp_enabled_flag && rpl_info_in_ph_flag ) { | |
|       ph_collocated_from_l0_flag | u(1) |
|       if( (ph_collocated_from_l0_flag && | |
|         num_ref_entries[ 0 ][ RplsIdx[ 0 ] ] > 1 ) | |
|        ( !ph_collocated_from_l0_flag && | |
|         num_ref_entries[ 1 ][ RplsIdx[ 1 ] ] > 1 ) ) | |
|       ph_collocated_ref_idx | ue(v) |
|     } | |
|   } | |
|   mvd_l1_zero_flag | u(1) |
|   if( sps_fpel_mmvd_enabled_flag ) | |
|     ph_fpel_mmvd_enabled_flag | u(1) |
|   if( sps_bdof_pic_present_flag ) | |
|     ph_disable_bdof_flag | u(1) |
|   if( sps_dmvr_pic_present_flag ) | |
|     ph_disable_dmvr_flag | u(1) |
|   if( sps_prof_pic_present_flag ) | |
|     ph_disable_prof_flag | u(1) |
|   if( ( pps_weighted_pred_flag \|\| pps_weighted_bipred_flag ) && wp_info_in_ph_flag ) | |
|     pred_weight_table( ) | |
| } | |
| if( qp_delta_info_in_ph_flag ) | |
|   ph_qp_delta | se(v) |
| if( sps_joint_cbcr_enabled_flag ) | |
|   ph_joint_cbcr_sign_flag | u(1) |
| if( sps_sao_enabled_flag && sao_info_in_ph_flag ) { | |
|   ph_sao_luma_enabled_flag | u(1) |
|   if( ChromaArrayType != 0 ) | |
|     ph_sao_chroma_enabled_flag | u(1) |
| } | |
| if( sps_dep_quant_enabled_flag ) | |
|   ph_dep_quant_enabled_flag | u(1) |
| if( sps_sign_data_hiding_enabled_flag && !ph_dep_quant_enabled_flag ) | |
|   pic_sign_data_hiding_enabled_flag | u(1) |
| if( deblocking_filter_override_enabled_flag && dbf_info_in_ph_flag ) { | |
|   ph_deblocking_filter_override_flag | u(1) |
|   if( ph_deblocking_filter_override_flag ) { | |
|     ph_deblocking_filter_disabled_flag | u(1) |
|     if( !ph_deblocking_filter_disabled_flag ) { | |
|       ph_beta_offset_div2 | se(v) |
|       ph_tc_offset_div2 | se(v) |
|       ph_cb_beta_offset_div2 | se(v) |
|       ph_cb_tc_offset_div2 | se(v) |
|       ph_cr_beta_offset_div2 | se(v) |

TABLE 1-continued

| | Descriptor |
|---|---|
|       ph_cr_tc_offset_div2<br>     }<br>    }<br>  }<br>  if( picture_header_extension_present_flag ) {<br>    ph_extension_length<br>    for( i = 0; i < ph_extension_length; i++ )<br>      ph_extension_data_byte[ i ]<br>  }<br>} | se(v)<br><br><br><br><br>ue(v)<br><br>u(8) |

Semantic of Selected Syntax Elements ph_temporal_mvp_enabled_flag specifies whether temporal motion vector predictors can be used for inter prediction for slices associated with the PH. If ph_temporal_mvp_enabled_flag is equal to 0, the syntax elements of the slices associated with the PH shall be constrained such that no temporal motion vector predictor is used in decoding of the slices. Otherwise if ph_temporal_mvp_enabled_flag is equal to 1, temporal motion vector predictors may be used in decoding of the slices associated with the PH. When not present, the value of ph_temporal_mvp_enabled_flag is inferred to be equal to 0. When no reference picture in the Decoded Picture Buffer (DPB) has the same spatial resolution as the current picture, the value of ph_temporal_mvp_enabled_flag shall be equal to 0.

The maximum number of subblock-based merging MVP candidates, MaxNumSubblockMergeCand, is derived as follows:

```
if (sps_affine_enabled_flag)
    MaxNumSubblockMergeCand = 5 −
        five_minus_max_num_subblock_merge_cand   (87)
else
    MaxNumSubblockMergeCand=sps_sbtmvp_enabled_flag &&
        ph_temporal_mvp_e
    nabled_flag;
``` where the value of MaxNumSubblockMergeCand shall be in the range of 0 to 5, inclusive.

slice_collocated_from_l0_flag equal to 1 specifies that the collocated picture used for temporal motion vector prediction is derived from reference picture list 0. slice collocated from l0_flag equal to 0 specifies that the collocated picture used for temporal motion vector prediction is derived from reference picture list 1.

When slice type is equal to B or P, ph_temporal_mvp_enabled_flag is equal to 1, and slice collocated from l0_flag is not present, the following applies:
  If rpl_info_in_ph_flag is equal to 1, slice collocated from l0_flag is inferred to be equal to ph_collocated_from_l0_flag.
  Otherwise (rpl_info_in_ph_flag is equal to 0 and slice type is equal to P), the value of slice_collocated_from_l0_flag is inferred to be equal to 1.

slice_collocated_ref_idx specifies the reference index of the collocated picture used for temporal motion vector prediction.

When slice type is equal to P or when slice type is equal to B and slice_collocated_from_l0_flag is equal to 1, slice_collocated_ref_idx refers to an entry in reference picture list 0, and the value of slice_collocated_ref_idx shall be in the range of 0 to NumRefIdxActive[0]−1, inclusive.

When slice type is equal to B and slice_collocated_from_l0_flag is equal to 0, slice_collocated_ref_idx refers to an entry in reference picture list 1, and the value of slice_collocated_ref_idx shall be in the range of 0 to NumRefIdxActive[1]−1, inclusive.

When slice_collocated_ref_idx is not present, the following applies:
  If rpl_info_in_ph_flag is equal to 1, the value of slice_collocated_ref_idx is inferred to be equal to ph_collocated_ref_idx.
  Otherwise (rpl_info_in_ph_flag is equal to 0), the value of slice_collocated_ref_idx is inferred to be equal to 0.

It is a requirement of bitstream conformance that the picture referred to by slice_collocated_ref_idx shall be the same for all slices of a coded picture.

It is a requirement of bitstream conformance that the values of pic_width_in_luma_samples and pic_height_in_luma_samples of the reference picture referred to by slice_collocated_ref_idx shall be equal to the values of pic_width_in_luma_samples and pic_height_in_luma_samples, respectively, of the current picture, and RprConstraintsActive[slice_collocated_from_l0_flag? 0:1][slice_collocated_ref_idx] shall be equal to 0.

Values of RprConstraintsActive[i][j] is derived in the section 8.3.2 in the VVC specification. The derivation of values of RprConstraintsActive[i][j] is described below.

Decoding Process for Reference Picture Lists Construction

The decoding process for reference picture lists construction is invoked at the beginning of the decoding process for each slice of a non-IDR picture.

Reference pictures are addressed through reference indices. A reference index is an index into a reference picture list. When decoding an I slice, no reference picture list is used in decoding of the slice data. When decoding a P slice, only reference picture list 0 (i.e., RefPicList[0]), is used in decoding of the slice data. When decoding a B slice, both reference picture list 0 and reference picture list 1 (i.e., RefPicList[1]) are used in decoding of the slice data.

At the beginning of the decoding process for each slice of a non-IDR picture, the reference picture lists RefPicList[0] and RefPicList[1] are derived. The reference picture lists are used in marking of reference pictures as specified in video coding standards or in decoding of the slice data.

For an I slice of a non-IDR picture that it is not the first slice of the picture, RefPicList[0] and RefPicList[1] may be derived for bitstream conformance checking purpose, but their derivation is not necessary for decoding of the current picture or pictures following the current picture in decoding order. For a P slice that it is not the first slice of a picture, RefPicList[1] may be derived for bitstream conformance checking purpose, but its derivation is not necessary for decoding of the current picture or pictures following the current picture in decoding order.

The reference picture lists RefPicList[0] and RefPicList[1], the reference picture scaling ratios RefPicScale[i][j][0] and RefPicScale[i][j][1], and the reference picture scaled flags RprConstraintsActive[0][j] and RprConstraintsActive[1][j] are derived as follows:

```
for( i = 0; i < 2; i++ ) {
  for( j = 0, k = 0, pocBase = PicOrderCntVal; j <
    num_ref_entries[ i ][ RplsIdx[ i ] ]; j++) {
    if( !inter_layer_ref_pic_flag[ i ][ RplsIdx[ i ] ][ j ] ) {
      if( st_ref_pic_flag[ i ][ RplsIdx[ i ] ][ j ] ) {
        RefPicPocList[ i ][ j ] = pocBase −
        DeltaPocValSt[ i ][ RplsIdx[ i ] ][ j ]
        if( there is a reference picture picA in the DPB with the same
        nuh_layer_id as the current
picture
            and PicOrderCntVal equal to RefPicPocList[ i ][ j ] )
          RefPicList[ i ][ j ] = picA
        else
          RefPicList[ i ][ j ] = "no reference picture"           (203)
        pocBase = RefPicPocList[ i ][ j ]
      } else {
        if( !delta_poc_msb_cycle_lt[ i ][ k ] ) {
          if( there is a reference picA in the DPB with the same
          nuh_layer_id as the current
picture and
              PicOrderCntVal & ( MaxPicOrderCntLsb − 1 ) equal
              to PocLsbLt[ i ][ k ] )
            RefPicList[ i ][ j ] = picA
          else
            RefPicList[ i ][ j ] = "no reference picture"
          RefPicLtPocList[ i ][ j ] = PocLsbLt[ i ][ k ]
        } else {
          if( there is a reference picA in the DPB with the same
          nuh_layer_id as the current
picture and
              PicOrderCntVal equal to FullPocLt[ i ][ k ] )
            RefPicList[ i ][ j ] = picA
          else
            RefPicList[ i ][ j ] = "no reference picture"
          RefPicLtPocList[ i ][ j ] = FullPocLt[ i ][ k ]
        }
        k++
      }
    } else {
      layerIdx = DirectRefLayerIdx[ GeneralLayerIdx[ nuh_layer_id ]
        ][ ilrp_idx[ i ][ RplsIdx ][ j ] ]
      refPicLayerId = vps_layer_id[ layerIdx ]
      if( there is a reference picture picA in the DPB with nuh_layer_id
      equal to refPicLayerId and
          the same PicOrderCntVal as the current picture )
        RefPicList[ i ][ j ] = picA
      else
        RefPicList[ i ][ j ] = "no reference picture"
    }
    fRefWidth is set equal to PicOutputWidthL of the reference picture
    RefPicList[ i ][ j ]
    fRefHeight is set equal to PicOutputHeightL of the reference picture
    RefPicList[ i ][ j ]
    refPicWidth, refPicHeight, refScalingWinLeftOffset,
    refScalingWinRightOffset,
refScalingWinTopOffset,
    and refScalingWinBottomOffset, are set equal to the values of
    pic_width_in_luma_samples,
    pic_height_in_luma_samples, scaling_win_left_offset,
    scaling_win_right_offset,
    scaling_win_top_offset, and scaling_win_bottom_offset,
    respectively, of the reference picture
    RefPicList[ i ][ j ]
    RefPicScale[ i ][ j ][ 0 ]=( ( fRefWidth << 14 ) +
    ( PicOutputWidthL >> 1 ) ) / PicOutputWidthL
    RefPicScale[ i ][ j ][ 1 ]=( ( fRefHeight << 14 ) +
    ( PicOutputHeightL >> 1 ) ) / PicOutputHeightL
    RprConstraintsActive[ i ][ j ] = ( pic_width_in_luma_samples !=
    refPicWidth | |
        pic_height_in_luma_samples != refPicHeight | |
        scaling_win_left_offset != refScalingWinLeftOffset | |
        scaling_win_right_offset != refScalingWinRightOffset | |
        scaling_win_top_offset != refScalingWinTopOffset | |
        scaling_win_bottom_offset != refScalingWinBottomOffset )
```

-continued

```
  }
}
``` scaling_win_left_offset, scaling_win_right_offset, scaling_win_top_offset, and scaling_win_bottom_offset specify the offsets that are applied to the picture size for scaling ratio calculation. When not present, the values of scaling_win_left_offset, scaling_win_right_offset, scaling_win_top_offset, and scaling_win_bottom_offset are inferred to be equal to pps_conf_win_left_offset, pps_conf_win_right_offset, pps_conf_win_top_offset, and pps_conf_win_bottom_offset, respectively.

The value of SubWidthC*(scaling_win_left_offset+scaling_win_right_offset) shall be less than pic_width_in_luma_samples, and the value of SubHeightC*(scaling_win_top_offset+scaling_win_bottom_offset) shall be less than pic_height_in_luma_samples.

The variables PicOutputWidthL and PicOutputHeightL are derived as follows:

PicOutputWidthL=pic_width_in_luma_samples−SubWidthC*(scaling_win_right_offset+scaling_win_left_offset)

PicOutputHeightL=pic_height_in_luma_samples−SubWidthC*(scaling_win_bottom_offset+scaling_win_top_offset).   (78)

Let refPicOutputWidthL and refPicOutputHeightL be the PicOutputWidthL and PicOutputHeightL, respectively, of a reference picture of a current picture referring to this PPS. It is a requirement of bitstream conformance that all of the following conditions are satisfied:

PicOutputWidthL*2 shall be greater than or equal to refPicWidthInLumaSamples.

PicOutputHeightL*2 shall be greater than or equal to refPicHeightInLumaSamples.

PicOutputWidthL shall be less than or equal to refPicWidthInLumaSamples*8.

PicOutputHeightL shall be less than or equal to refPicHeightInLumaSamples*8.

PicOutputWidthL*pic_width_max_in_luma_samples shall be greater than or equal to refPicOutputWidthL*(pic_width_in_luma_samples−Max(8, MinCbSizeY)).

PicOutputHeightL*pic_height_max_in_luma_samples shall be greater than or equal to refPicOutputHeightL*(pic_height_in_luma_samples'Max(8, MinCbSizeY)).

In current VVC, mvd_l1_zero_flag is signaled in the PH without any conditional constraint. However, the feature controlled by the flag mvd_l1_zero_flag is only applicable when the slice is a bi-predictive slice (B-slice). Therefore, the flag signaling is redundant when the slice associated with the picture header is not a B-slice.

In another example, ph_disable_bdof flag and ph_disable_dmvr_flag are signaled in the PH only when the corresponding enabling flags (sps_bdof_pic_present_flag, sps_dmvr_pic_present_flag) signaled in sequence parameter set (SPS) are true, respectively. As shown in Table 2 below, however, the features controlled by the flags ph_disable_bdof_flag and ph_disable_dmvr_flag are only applicable when the slice is a bi-predictive slice (B-slice). Therefore, the signaling of these two flags is redundant or useless when the slices associated with the picture header is not a B-slice.

TABLE 2

```
if( sps_bdof_pic_present_flag )
  ph_disable_bdof_flag
```

TABLE 2-continued

```
if( sps_dmvr_pic_present_flag )
    ph_disable_dmvr_flag
```

One more example can also be seen on the syntax elements ph_collocated_from_l0_flag to indicate the collocatd picture is from list0 or list1. And another example can be seen on the syntax pred_weight_table( ) which are the syntax elements related to the weighting tabled for the bi-predictive preidction, as shown below.

```
if( ph_temporal_mvp_enabled_flag && rpl_info_in_ph_flag ) {
    ph_collocated_from_l0_flag
if( ( pps_weighted_pred_flag || pps_weighted_bipred_flag ) && wp_info_in_ph_flag )
    pred_weight_table( )
```

| pred_weight_table( ) { | Descriptor |
|---|---|
| luma_log2_weight_denom | ue(v) |
| if( ChromaArrayType != 0 ) | |
|   delta_chroma_log2_weight_denom | se(v) |
| if( wp_info_in_ph_flag) | |
|   num_l0_weights | ue(v) |
| for( i = 0; i < NumWeightsL0; i++ ) | |
|   luma_weight_l0_flag[ i ] | u(l) |
| if( ChromaArrayType != 0) | |
|   for( i = 0; i < NumWeightsL0; i++ ) | |
|     chroma_weight_l0_flag[ i ] | u(1) |
| for( i = 0; i < NumWeightsL0; i++ ) { | |
|   if( luma_weight_l0_flag[ i ] ) { | |
|     delta_luma_weight_l0[ i ] | se(v) |
|     luma_offset_l0[ i ] | se(v) |
|   } | |
|   if( chroma_weight_l0_flag[ i ] ) | |
|     for(j = 0; j < 2; j++ ) { | |
|       delta_chroma_weight_l0[ i ][ j ] | se(v) |
|       delta_chroma_offset_l0[ i ][ j ] | se(v) |
|     } | |
| } | |
| if( pps_weighted_bipred_flag && wp_info_in_ph_flag ) | |
|   num_l1_weights | ue(v) |
| for( i = 0; i < NumWeightsL1; i++ ) | |
|   luma_weight_l1 _flag[ i ] | u(1) |
| if( ChromaArrayType != 0) | |
|   for( i = 0; i < NumWeightsL1; i++ ) | |
|     chroma_weight_l1 _flag[ i ] | u(1) |
| for( i = 0; i < NumWeightsL1; i++ ) { | |
|   if( luma_weight_l1_flag[ i ] ) { | |
|     delta_luma_weight_l1 [ i ] | se(v) |
|     luma_offset_l1[ i ] | se(v) |
|   } | |
|   if( chroma_weight_l1_flag[ i ] ) | |
|     for( j = 0; j < 2; j++ ) { | |
|       delta_chroma_weight_l1[ i ][ j ] | se(v) |
|       delta_chroma_offset_l1[ i ][ j ] | se(v) |
|     } | |
| } | |
| } | |

A third problem is associated with the syntax ph_temporal_mvp_enabled_flag. In current VVC, because the resolution of the collocated picture selected for TMVP derivation shall be the same as the resolution of the current picture, there is a bitstream conformance constraint to check the value of ph_temporal_mvp_enabled_flag as illustrated below.

When no reference picture in the DPB has the same spatial resolution as the current picture, the value of ph_temporal_mvp_enabled_flag shall be equal to 0. However, in current VVC, not only the resolution of the collocated picture will affect the enabling of TMVP, but also the offsets that are applied to the picture size for scaling ratio calculation affect the enabling of TMVP. In current VVC, however, the offsets are not considered in the bitstream conformance of ph_temporal_mvp_enabled_flag.

Moreover, there is a requirement of bitstream conformance that the picture referred to by slice_collocated_ref_idx shall be the same for all slices of a coded picture. However, when a coded picture has multiple slices and there is no common reference picture existing among all these slices, this bitstream conformance has no chance to be met. And in such case, ph_temporal_mvp_enabled_flag should be constrained to be 0.

Several methods are proposed to address the issues described above. The proposed methods could be applied independently or combinedly.

Since the features controlled by the flags mvd_l1_zero_flag, ph_disable_bdof_flag and ph_disable_dmvr_flag are only applicable when the slice is a bi-predictive slice (B-slice), according to a method of the disclosure, it is proposed to signal these flags only when the associated slices are B-slices. It is noted that when the reference picture lists are signaled in PH (e.g. rpl_info_in_ph_flag=1), it means all the slices of the coded picture use the same reference pictures signaled in PH. Therefore, when the reference picture lists are signaled in PH and the signaled reference picture lists indicate that the current picture is not bi-predictive, the flags mvd_l1_zero_flag, ph_disable_bdof_flag and ph_disable_dmvr_flag need not to be signaled.

In some examples, some conditions are added to those syntaxes set in PH to prevent redundant signaling or undefined decoding behavior due to improper values sent for some of the syntaxes in the picture header. Some examples are illustrated below, wherein variables num_ref_entries[i][RplsIdx[i]] represent the number of reference pictures in the list i.

In some examples, the condition may be shown as below:
If (rpl_info_in_ph_flag && num_ref_entries[0][RplsIdx[0]]>1 && num_ref_entries[1][RplsIdx[1]]>1)
  mvd_l1_zero_flag In some examples, the condition may be shown as below:
If (!rpl_info_in_ph_flag||(rpl_info_in_ph_flag && num_ref_entries[0][RplsIdx[0]]>1 && num_ref_entries[1][RplsIdx[1]]>1))
  mvd_l1_zero_flag In some examples, the condition may be shown as below:
If (!rpl_info_in_ph_flag||(rpl_info_in_ph_flag && num_ref_entries[0][RplsIdx[0]]>0 && num_ref_entries[1][RplsIdx[1]]>0))
  mvd_l1_zero_flag Alternatively, the conditions can be written in a more compact form which gives the same results. Because a bi-predictive slice (B-slice) or bi-predictive picture must have at least one list1 reference picture, it can only check whether current slice/picture has list1 reference picture. An example of the alternative condition checking is illustrated below:
If (!rpl_info_in_ph_flag||(rpl_info_in_ph_flag && num_ref_entries[1][RplsIdx[1]]>0))
  mvd_l1_zero_flag The semantics of mvd_l1_zero_flag is also modified to handle the case when it is not signaled.

mvd_l1_zero_flag equal to 1 indicates that the mvd_coding(x0, y0, 1) syntax structure is not parsed and MvdL1[x0][y0][compIdx] and MvdCpL1[x0][y0][cpIdx][compIdx] are set equal to 0 for compIdx=0 . . . 1 and cpIdx=0 . . . 2. mvd_l1_zero_flag equal to 0 indicates that the mvd_coding (x0, y0, 1) syntax structure is parsed. When not present, the value of mvd_l1_zero_flag is inferred to be 0.

Several examples of conditionally signalling the syntax element ph_disable_dmvr_flag are illustrated below:
If (sps_dmvr_pic_present_flag && rpl_info_in_ph_flag && num_ref_entries[0][RplsIdx[0]]>1 && num_ref_entries[1][RplsIdx[1]]>1) ph_disable_dmvr_flag
or If (sps_dmvr_pic_present_flag && (!rpl_info_in_ph_flag|| (rpl_info_in_ph_flag && num_ref_entries[0][RplsIdx[0]]>1 && num_ref_entries[1][RplsIdx[1]]>1)))
  ph_disable_dmvr_flag
or If (sps_dmvr_pic_present_flag && (!rpl_info_in_ph_flag|| (rpl_info_in_ph_flag && num_ref_entries[0][RplsIdx[0]]>0 && num_ref_entries[1][RplsIdx[1]]>0)))
  ph_disable_dmvr_flag Another example of the alternative condition checking is illustrated below:
If (sps_dmvr_pic_present_flag && (!rpl_info_in_ph_flag|| (rpl_info_in_ph_flag && num_ref_entries[1][RplsIdx[1]]>0)))
  ph_disable_dmvr_flag The semantics of ph_disable_dmvr_flag is also modified to handle the case when it is not signaled.

ph_disable_dmvr_flag equal to 1 specifies that decoder motion vector refinement based inter bi-prediction is disabled in the slices associated with the PH. ph_disable_dmvr_ flag equal to 0 specifies that decoder motion vector refinement based inter bi-prediction may or may not be enabled in the slices associated with the PH.

When ph_disable_dmvr_flag is not present, the following applies:
  If sps_dmvr_enabled_flag is equal to 1 and sps_dmvr_pic_present_flag is equal to 0, the value of ph_disable_dmvr_flag is inferred to be equal to 0.
  Else if sps_dmvr_enabled_flag is equal to 1 and sps_dmvr_pic_present_flag is equal to 1, the value of ph_disable_dmvr_flag is inferred to be equal to 1.
  Otherwise (sps_dmvr_enabled_flag is equal to 0), the value of ph_disable_dmvr_flag is inferred to be equal to 1.

Another example to derive the value of ph_disable_dmvr_flag when it is not presented is illustrated below:
  if all the conditions are considered for the derivation of the value of ph_disable_dmvr_flag when it is either explicitly signalled or implicitly derived:
  If sps_dmvr_enabled_flag is equal to 1 and sps_dmvr_pic_present_flag is equal to 0, the value of ph_disable_dmvr_flag is inferred to be equal to 0.
  Else if sps_dmvr_enabled_flag is equal to 0 and sps_dmvr_pic_present_flag is equal to 0, the value of ph_disable_dmvr_flag is inferred to be equal to 1.
  Else if sps_dmvr_enabled_flag is equal to 1 and sps_dmvr_pic_present_flag is equal to 1 and rpl_info_in_ph_flag is equal to 0, the value of ph_disable_dmvr_flag is inferred to be equal to X. (X is explicitly signalled)
  Else if sps_dmvr_enabled_flag is equal to 1 and sps_dmvr_pic_present_flag is equal to 1 and rpl_info_in_ph_flag is equal to 1 and num_ref_entries[1][RplsIdx[1]]>0, the value of ph_disable_dmvr_flag is inferred to be equal to X. (X is explicitly signalled)
  Else (sps_dmvr_enabled_flag is equal to 1 and sps_dmvr_pic_present_flag is equal to 1 and rpl_info_in_ph_flag is equal to 1 and num_ref_entries[1][RplsIdx[1]]==0), the value of ph_disable_dmvr_flag is inferred to be equal to 1.

Since the syntax element ph_disable_dmvr_flag is explicitly signalled under the third and the fourth conditions, they can be removed from the derivation of ph_disable_dmvr_flag when ph_disable_dmvr_flag is not present.

When ph_disable_dmvr_flag is not present, the following applies:
  If sps_dmvr_enabled_flag is equal to 1 and sps_dmvr_pic_present_flag is equal to 0, the value of ph_disable_dmvr_flag is inferred to be equal to 0.
  Else if sps_dmvr_enabled_flag is equal to 0 and sps_dmvr_pic_present_flag is equal to 0, the value of ph_disable_dmvr_flag is inferred to be equal to 1.
  Else (sps_dmvr_enabled_flag is equal to 1 and sps_dmvr_pic_present_flag is equal to 1 and rpl_info_in_ph_flag is equal to 1 and num_ref_entries[1][RplsIdx[1]]==0), the value of ph_disable_dmvr_flag is inferred to be equal to 1.

The conditions can be editorially simplified as below:
when ph_disable_dmvr_flag is not present, the following applies:
  If sps_dmvr_enabled_flag is equal to 1 and sps_dmvr_pic_present_flag is equal to 0, the value of ph_disable_dmvr_flag is inferred to be equal to 0.
  Otherwise (sps_dmvr_enabled_flag is equal to 0 or sps_dmvr_pic_present_flag is equal to 1), the value of ph_disable_dmvr_flag is inferred to be equal to 1.

Another example to derive the value of ph_disable_dmvr_flag when it is not presented is illustrated below:

When ph_disable_dmvr_flag is not present, the following applies:
  If sps_dmvr_pic_present_flag is equal to 0, the value of ph_disable_dmvr_flag is inferred to be equal to 1−sps_dmvr_enabled_flag.
  Else if sps_dmvr_pic_present_flag is equal to 1 and rpl_info_in_ph_flag is equal to 0, the value of ph_disable_dmvr_flag is inferred to be equal to 1−sps_dmvr_enabled_flag.
  Else if sps_dmvr_pic_present_flag is equal to 1 and rpl_info_in_ph_flag is equal to 1 and num_ref_entries[1][RplsIdx[1]]>0, the value of ph_disable_dmvr_flag is inferred to be equal to 1−sps_dmvr_enabled_flag.
  Else (sps_dmvr_pic_present_flag is equal to 1 and rpl_info_in_ph_flag is equal to 1 and num_ref_entries[1][RplsIdx[1]]==0), the value of ph_disable_dmvr_flag is inferred to be equal to 1.

In some examples, since the syntax element ph_disable_dmvr_flag is explicitly signalled under the second and the third conditions above, they can be removed from the derivation of ph_disable_dmvr_flag when it is not present.

In some examples, when ph_disable_dmvr_flag is not present, the following applies: if sps_dmvr_pic_present_flag is equal to 0, the value of ph_disable_dmvr_flag is inferred to be equal to 1−sps_dmvr_enabled_flag; otherwise, the value of ph_disable_dmvr_flag is inferred to be equal to 1.

Several examples of conditionally signalling the syntax element ph_disable_bdof_flag are illustrated below:
If (sps_bdof_pic_present_flag && rpl_info_in_ph_flag && num_ref_entries[0][RplsIdx[0]]>1 && num_ref_entries[1][RplsIdx[1]]>1) ph_disable_bdof_flag
Or If (sps_bdof_pic_present_flag && (!rpl_info_in_ph_flag|| (rpl_info_in_ph_flag && num_ref_entries[0][RplsIdx[0]]>1 && num_ref_entries[1][RplsIdx[1]]>1))) ph_disable_bdof_flag In some examples, an example of the alternative condition checking is illustrated below:
If (sps_bdof_pic_present_flag && (!rpl_info_in_ph_flag|| (rpl_info_in_ph_flag && num_ref_entries[1][RplsIdx[1]]>0))) ph_disable_bdof_flag The semantics of ph_disable_bdof_flag is also modified to handle the case when it is not signaled.

ph_disable_bdof_flag equal to 1 specifies that bi-directional optical flow inter prediction based inter bi-prediction is disabled in the slices associated with the PH. ph_disable_bdof_flag equal to 0 specifies that bi-directional optical flow inter prediction based inter bi-prediction may or may not be enabled in the slices associated with the PH.

When ph_disable_bdof_flag is not present, the following applies:
  If sps_bdof enabled flag is equal to 1 and sps_bdof_pic_present_flag is equal to 0, the value of ph_disable_bdof_flag is inferred to be equal to 0.
  Else if sps_bdof enabled flag is equal to 1 and sps_bdof_pic_present_flag is equal to 1, the value of ph_disable_dmvr_flag is inferred to be equal to 1.
  Otherwise (sps_bdof enabled flag is equal to 0, the value of ph_disable_bdof_flag is inferred to be equal to 1.

An alternative way to derive the value of ph_disable_bdof_flag when it is not presented is illustrated below:
If all the conditions are considered for the derivation of the value of ph_disable_bdof_flag when it is either explicitly signalled or implicitly derived:
  If sps_bdof_enabled_flag is equal to 1 and sps_bdof_pic_present_flag is equal to 0, the value of ph_disable_bdof_flag is inferred to be equal to 0.
  Else if sps_bdof_enabled_flag is equal to 0 and sps_bdof_pic_present_flag is equal to 0, the value of ph_disable_bdof_flag is inferred to be equal to 1.
  Else if sps_bdof_enabled_flag is equal to 1 and sps_bdof_pic_present_flag is equal to 1 and rpl_info_in_ph_flag is equal to 0, the value of ph_disable_bdof_flag is inferred to be equal to X. (X is explicitly signalled)
  Else if sps_bdof_enabled_flag is equal to 1 and sps_bdof_pic_present_flag is equal to 1 and rpl_info_in_ph_flag is equal to 1 and num_ref_entries[1][RplsIdx[1]]>0, the value of ph_disable_bdof_flag is inferred to be equal to X. (X is explicitly signalled)
  Else (sps_bdof_enabled_flag is equal to 1 and sps_bdof_pic_present_flag is equal to 1 and rpl_info_in_ph_flag is equal to 1 and num_ref_entries[1][RplsIdx[1]]==0), the value of ph_disable_bdof_flag is inferred to be equal to 1.

Since the syntax element ph_disable_bdof_flag is explicitly signalled under the third and the fourth conditions, they can be removed from the derivation of ph_disable_bdof_flag when ph_disable_bdof_flag is not present:

When ph_disable_bdof_flag is not present, the following applies:
  If sps_bdof_enabled_flag is equal to 1 and sps_bdof_pic_present_flag is equal to 0, the value of ph_disable_bdof_flag is inferred to be equal to 0.
  Else if sps_bdof_enabled_flag is equal to 0 and sps_bdof_pic_present_flag is equal to 0, the value of ph_disable_bdof_flag is inferred to be equal to 1.
  Else (sps_bdof_enabled_flag is equal to 1 and sps_bdof_pic_present_flag is equal to 1 and rpl_info_in_ph_flag is equal to 1 and num_ref_entries[1][RplsIdx[1]]==0), the value of ph_disable_bdof_flag is inferred to be equal to 1.

The conditions can be editorially simplified as below:
When ph_disable_bdof_flag is not present, the following applies:
  If sps_bdof_enabled_flag is equal to 1 and sps_bdof_pic_present_flag is equal to 0, the value of ph_disable_bdof_flag is inferred to be equal to 0.
  Otherwise (sps_bdof_enabled_flag is equal to 0 or sps_bdof_pic_present_flag is equal to 1), the value of ph_disable_bdof_flag is inferred to be equal to 1.

Another alternative way to derive the value of ph_disable_bdof_flag when it is not presented is illustrated below:
when ph_disable_bdof_flag is not present, the following applies:
  If sps_bdof_pic_present_flag is equal to 0, the value of ph_disable_bdof_flag is inferred to be equal to 1−sps_bdof_enabled_flag.
  Else if sps_bdof_pic_present_flag is equal to 1 and rpl_info_in_ph_flag is equal to 0, the value of ph_disable_bdof_flag is inferred to be equal to 1−sps_bdof_enabled_flag.
  Else if sps_bdof_pic_present_flag is equal to 1 and rpl_info_in_ph_flag is equal to 1 and num_ref_entries[1][RplsIdx[1]]>0, the value of ph_disable_bdof_flag is inferred to be equal to 1−sps_bdof_enabled_flag.
  Else (sps_bdof_pic_present_flag is equal to 1 and rpl_info_in_ph_flag is equal to 1 and num_ref_entries[1][RplsIdx[1]]==0), the value of ph_disable_bdof_flag is inferred to be equal to 1.

In some examples, since the syntax element ph_disable_bdof_flag is explicitly signalled under the second and the third conditions, they can be removed from the derivation of ph_disable_bdof_flag when it is not present.

When ph_disable_bdof_flag is not present, the following applies:
- If sps_bdof_pic_present_flag is equal to 0, the value of ph_disable_bdof_flag is inferred to be equal to 1−sps_bdof_enabled_flag.
- Otherwise, the value of ph_disable_bdof_flag is inferred to be equal to 1.

Moreover, the signalling conditions for syntax elements ph_collocated_from_l0_flag and weight table( ) are modified because the two types of syntax elements are only applicable when the associated slices are B-slices. Examples of the modified syntax elements signaling are illustrated below.

```
if( ph_temporal_mvp_enabled_flag && (num_ref_entries[ 0 ][ RplsIdx[ 0 ] ] > 1 &&
  num_ref_entries[ 1 ][ RplsIdx[ 1 ] ] > 1))) {
    ph_collocated_from_l0_flag
or
```

```
if( ph_temporal_mvp_enabled_flag && (num_ref_entries[ 0 ][ RplsIdx[ 0 ] ] > 0 &&
  num_ref_entries[ 1 ][ RplsIdx[ 1 ] ] > 0))) {
    ph_collocated_from_l0_flag
```

The semantics of ph_collocated_from_l0_flag is also modified to handle the case when it is not signaled.

ph_collocated_from_l0_flag equal to 1 specifies that the collocated picture used for temporal motion vector prediction is derived from reference picture list 0. ph_collocated_from_l0_flag equal to 0 specifies that the collocated picture used for temporal motion vector prediction is derived from reference picture list 1.

When ph_collocated_from_l0_flag is not present, the following applies:
- If num_ref_entries[0][RplsIdx[0]] is larger than 1, the value of ph_collocated_from_l0_flag is inferred to be 1.
- Otherwise (num_ref_entries[1][RplsIdx[1]] is larger than 1), the value of ph_collocated_from_l0_flag is inferred to be 0.

| if( (pps_weighted_pred_flag \|\| pps_weighted_bipred_flag ) && wp_info_in_ph_flag flag )<br>    pred_weight_table( ) | |
|---|---|
| pred_weight_table( ) { | Descriptor |
|   luma_log2_weight_denom | ue(v) |
|   if( ChromaArrayType != 0 ) | |
|     delta_chroma_log2_weight_denom | se(v) |
|   if( wp_info_in_ph flag) | |
|     num_l0_weights | ue(v) |
|   for( i = 0; i < NumWeightsL0; i++ ) | |
|     luma_weight_l0 _flag[ i ] | u(1) |
|   if( ChromaArrayType != 0) | |
|     for( i = 0; i < NumWeightsL0; i++ ) | |
|       chroma_weight_l0 _flag[ i ] | u(1) |
|   for( i = 0; i < NumWeightsL0; i++ ) { | |
|     if( luma_weight_l0_flag[ i ] ) { | |
|       delta_luma_weight_l0[ i ] | se(v) |
|       luma_offset_l0[ i ] | se(v) |
|     } | |
|     if( chroma_weight_l0_flag[ i ] ) | |
|       for(j = 0; j < 2; j++ ) { | |
|         delta_chroma_weight_l0[ i ][ j ] | se(v) |
|         delta_chroma_offset_l0[ i ][ j ] | se(v) |
|       } | |
|   } | |
|   if( pps_weighted_bipred_flag && wp_info_in_ph_flag && (!rpl_info_in_ph_flag \|\|<br>(rpl_info_in_ph_flag && num_ref_entries[ 0 ][ RplsIdx[ 0 ] ] > 0&& num_ref_entries[ 1 ][ RplsIdx[ 1 ] ] > 0))) | |
|     num_l1_weights | ue(v) |
|   for( i = 0; i < NumWeightsL1; i++ ) | |
|     luma_weight_l1 _flag[ i ] | u(1) |
|   if( ChromaArrayType != 0) | |
|     for( i = 0; i < NumWeightsL1; i++ ) | |
|       chroma_weight_l1 _flag[ i ] | u(1) |
|   for( i = 0; i < NumWeightsL1; i++ ) { | |
|     if( luma_weight_l1_flag[ i ] ) { | |
|       delta_luma_weight_l1 [ i ] | se(v) |
|       luma_offset_l1[ i ] | se(v) |
|     } | |
|     if( chroma_weight_l1_flag[ i ] ) | |
|       for(j = 0; j < 2; j++ ) { | |
|         delta_chroma_weight_l1[ i ][ j ] | se(v) |
|         delta_chroma_offset_l1[ i ][ j ] | se(v) |
|       } | |
|   } | |
| } | |

Similarly, an example of the alternative condition checking is illustrated below:
if(pps_weighted_bipred_flag && wp_info_in_ph_flag && (!rpl_info_in_ph_flag|| (rpl_info_in_ph_flag && num_ref_entries[1][RplsIdx[1]]>0)))
　　num_l1_weights The semantics of the syntax elements in pred_weight_table( ) are also modified to handle the case when they are not signaled.

num_l1_weights specifies the number of weights signalled for entries in reference picture list 1 when pps_weighted_bipred_flag and wp_info_in_ph_flag are both equal to 1. The value of num_l1_weights shall be in the range of 0 to Min(15, num_ref_entries[1][RplsIdx[1]]), inclusive.

The variable NumWeightsL1 is derived as follows:

```
if( !pps_weighted_bipred_flag)
    NumWeightsL1 = 0
else if (wp_info_in_ph_flag && rpl_info_in_ph_flag &&
(num_ref_entries[ 0 ][
RplsIdx[ 0 ] ] ==0 || num_ref_entries[ 1 ][ RplsIdx[ 1 ] ] >==0))
    NumWeightsL1 = 0
else if( wp_info_in_ph_flag )
    NumWeightsL1 = num_l1_weights
else
    NumWeightsL1 = NumRefIdxActive[ 1 ]
```

In the semantics of the syntax elements in pred_weight_table( ) an alternative way to derive the value of num_l1_weights when it is not presented is illustrated below:
　　num_l1_weights specifies the number of weights signalled for entries in reference picture list 1 when pps_weighted_bipred_flag and wp_info_in_ph_flag are both equal to 1. The value of num_l1_weights shall be in the range of 0 to Min(15, num_ref_entries[1][RplsIdx[1]]), inclusive. When not present, the value of num_l1_weights is inferred to be 0.

The variable NumWeightsL1 is derived as follows:

```
if( !pps_weighted_bipred_flag)
    NumWeightsL1 = 0
else if( wp_info_in_ph_flag )
    NumWeightsL1 = num_l1_weights
else
    NumWeightsL1 = NumRefIdxActive[ 1 ]
```

In the semantics of the syntax elements in pred_weight_table( ) another alternative way to derive the value of num_l1_weights when it is not presented is illustrated below:

```
if( !pps_weighted_bipred_flag || ( wp_info_in_ph_flag &&
num_ref_entries[ 1 ]
[ RplsIdx[ 1 ] ] = = 0 ) )
    NumWeightsL1 = 0
else if( wp_info_in_ph_flag )
    NumWeightsL1 = num_l1_weights
else
    NumWeightsL1 = NumRefIdxActive[ 1 ]
```

Conceptually, it is proposed to add signaling condition to check whether the current picture has reference pictures from both list0 and list1 reference picture lists for any syntax elements which is only applicable in B slices to avoid signaling redundant bits. The checking condition is not limited to the above mentioned method to check the size of both reference picture lists (e.g. list 0/list1 reference picture lists) and the checking condition may be any other method to indicate whether current picture has reference pictures from both list0 and list1 reference picture lists. For example, a flag can be signaled to indicate whether current picture has both list0 and lits1 reference pictures.

When the syntax elements are not signaled and the reference picture list information is signaled in the picture header (PH), the values of the syntax elements are derived using the information whether current picture has both list0 and list1 reference pictures or it has only list0 or list1 reference pictures. In one example, when ph_collocated_from_l0_flag is not signaled, its value is inferred to be the only reference picture that current picture has. In another example, when sps_bdof_enabled_flag is equal to 1 and sps_bdof picpresent_flag is equal to 1 but ph_disable_bdof_flag is not signalled, it implies that either num_ref_entries[0][RplsIdx[0]] is equal to 0 or num_ref_entries[1][RplsIdx[1]] is equal to 0 according the proposed signalling condition on ph_disable_bdof_flag. Therefore, under this condition, ph_disable_bdof_flag is not signalled and is inferred as 1. In current VVC, not only the resolution of the collocated picture may affect the enabling of TMVP but also the offsets applied to the picture size for scaling ratio calculation may affect the enabling of TMVP. In current VVC, however, the offsets are not considered in the bitstream conformance of ph_temporal_mvp_enabled_flag. In the second embodiment, it is proposed to add a bitstream conformance constraint to the current VVC requiring that the value of ph_temporal_mvp_enabled_flag shall be dependent on the offsets that are applied to the picture size for scaling ratio calculation, as illustrated below.

When no reference picture in the DPB has the same spatial resolution and the same offsets that are applied to the picture size for scaling ratio calculation as the current picture, the value of ph_temporal_mvp_enabled_flag shall be equal to 0.

The above sentences can also be written in another way as below:
when no reference picture in the DPB has the associated variable value RprConstraintsActive[i][j] equal to 0, the value of ph_temporal_mvp_enabled_flag shall be equal to 0.

In current VVC, there is a requirement of bitstream conformance that the picture referred to by slice_collocated_ref_idx shall be the same for all slices of a coded picture. However, when the coded picture has multiple slices and there is no common reference picture existing among all these slices, this bitstream conformance has no chance to be met. In the third embodiment of the disclosure, the requirement of bitstream conformance on ph_temporal_mvp_enabled_flag is modified to consider whether there is a common reference picture existing among all the slices in the current picture. Based on the embodiment, several exemplary modifications to the VVC specification are illustrated below.

ph_temporal_mvp_enabled_flag specifies whether temporal motion vector predictors can be used for inter prediction for slices associated with the PH. If ph_temporal_mvp_enabled_flag is equal to 0, the syntax elements of the slices associated with the PH shall be constrained such that no temporal motion vector predictor is used in decoding of the slices. Otherwise (ph_temporal_mvp_enabled_flag is equal to 1), temporal motion vector predictors may be used in decoding of the slices associated with the PH. When not present, the value of ph_temporal_mvp_enabled_flag is inferred to be equal to 0. When no reference picture in the DPB has the same spatial resolution as the current picture, the value of ph_temporal_mvp_enabled_flag shall be equal to 0. When no common reference picture exists in all the slices associated with the PH, the value of ph_temporal_mvp_enabled_flag shall be equal to 0.

ph_temporal_mvp_enabled_flag specifies whether temporal motion vector predictors can be used for inter prediction for slices associated with the PH. If ph_temporal_mvp_enabled_flag is equal to 0, the syntax elements of the slices associated with the PH shall be constrained such that no temporal motion vector predictor is used in decoding of the slices. Otherwise (ph_temporal_mvp_enabled_flag is equal to 1), temporal motion vector predictors may be used in decoding of the slices associated with the PH. When not present, the value of ph_temporal_mvp_enabled_flag is inferred to be equal to 0. When no reference picture in the DPB has the same spatial resolution as the current picture, the value of ph_temporal_mvp_enabled_flag shall be equal to 0. When no common reference picture exists in all the inter slices associated with the PH, the value of ph_temporal_mvp_enabled_flag shall be equal to 0.

ph_temporal_mvp_enabled_flag specifies whether temporal motion vector predictors can be used for inter prediction for slices associated with the PH. If ph_temporal_mvp_enabled_flag is equal to 0, the syntax elements of the slices associated with the PH shall be constrained such that no temporal motion vector predictor is used in decoding of the slices. Otherwise (ph_temporal_mvp_enabled_flag is equal to 1), temporal motion vector predictors may be used in decoding of the slices associated with the PH. When not present, the value of ph_temporal_mvp_enabled_flag is inferred to be equal to 0. When no reference picture in the DPB has the same spatial resolution as the current picture, the value of ph_temporal_mvp_enabled_flag shall be equal to 0. When no common reference picture exists in all the non-intra slices associated with the PH, the value of ph_temporal_mvp_enabled_flag shall be equal to 0.

In one example, the bitstream conformance on slice_collocated_ref_idx is simplified as below:

It is a requirement of bitstream conformance that the values of pic_width_in_luma_samples and pic_height_in_luma_samples of the reference picture referred to by slice_collocated_ref_idx shall be equal to the values of pic_width_in_luma_samples and pic_height_in_luma_samples, respectively, of the current picture, and RprConstraintsActive[slice_collocated_from_10_flag? 0: 1][slice_collocated_ref_idx] shall be equal to 0.

The above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

In current VVC spec, we have two bitstream conformance on the limitation of the resolution of the collocated picture. One is posed on the ph_temporal_mvp_enabled_flag and the other one is posed on the bitstream conformance on slice_collocated_ref_idx. However, it is redundant having the two bitstreams confromance in the VVC spec in terms of funcationality because they both prohibit using a collocated picture which has different resolution and/or different scaling offsets from the current picture. To reduce the burdan of the encoder to check the bitstream confromacne, in the fifth embodiment, it is proposed to apply only the bitstream confromace slice_collocated_ref_idx. An example of the revised specification of VVC is illustrated below. The changed parts are highlighted.

ph_temporal_mvp_enabled_flag specifics whether temporal motion vector predictors can be used for inter prediction for slices associated with the PH. If ph_temporal_mvp_enabled_ flag is equal to 0, the syntax elements of the slices associated with the PH shall be constrained such that no temporal motion vector predictor is used in decoding of the slices. Otherwise (ph_temporal_mvp_enabled_flag is equal to 1). temporal motion vector predictors may be used in decoding of the slices associated with the PH. When not present, the value of ph_temporal_mvp_enabled_flag is inferred to be equal to 0. The other one is posed on the bitstream conformance on slice_collocated_ref_idx as illustrated below: slice_collocated_ref_idx specifies the reference index of the collocated picture used for temporal motion vector prediction.

It is a requirement of bitstream conformance that the values of pic_width_in_luma_samples and pic_height_in_luma_samples of the reference picture referred to by slice_collocated_ref_idx shall be equal to the values of pic_width_in_lunma_samples and pic_height_in_luma_samples, respectively, of the current picture, and RprConstraintsActive [slice_collocated_from_10_flag?0: 1][slice_collocated_ref_idx] shall be equal to 0.

In one example, it is proposed to apply only the bitstream conformance ph_temporal_mvp_enabled_flag. An example of the revised specification of VVC is illustrated below.

ph_teitiporal_mvp_enabled_flag specifics whether temporal motion vector predictors can be used for inter prediction for slices associated with the PH If phtemporalmvpenabledflag is equal to 0, the syntax elements of the slices associated with the PH shall be constrained such that no temporal motion vector predictor is used in decoding of the slices. Otherwise (phtemporalmvp enabled flag is equal to 1), temporal motion vector predictors may be used in decoding of the slices associated with the PH. When not present, the value of ph temporal mvp enabled flag is inferred to be equal to 0. When no reference picture in the DPB has the same spatial resolution as the current picture, the value of ph temporal mvp enabled flag shall be equal to 0.

The other one is posed on the bitstream conformance on slicc_collocated_ref_idx as illustrated below: slice_collocated_ref_idx specifics the reference index of the collocated picture used for temporal motion vector prediction.

Figure 5:
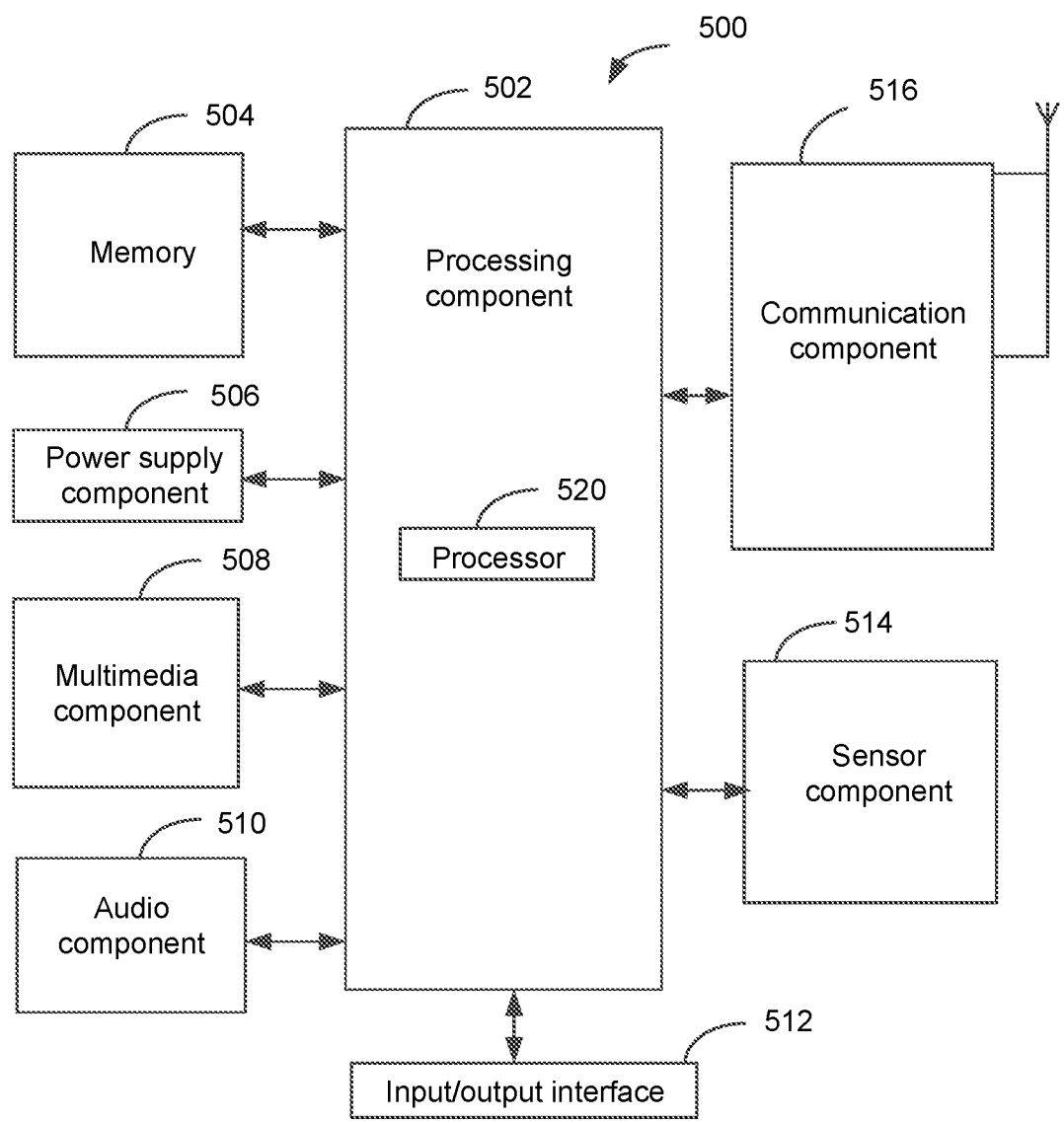
FIG. 5 is a block diagram illustrating an exemplary apparatus for video coding in accordance with some implementations of the present disclosure.

FIG. 5 is a block diagram illustrating an exemplary apparatus for video coding in accordance with some implementations of the present disclosure. The apparatus 500 may be a terminal, such as a mobile phone, a tablet computer, a digital broadcast terminal, a tablet device, or a personal digital assistant.

As shown in FIG. 5, the apparatus 500 may include one or more of the following components: a processing component 502, a memory 504, a power supply component 506, a multimedia component 508, an audio component 510, an input/output (I/O) interface 512, a sensor component 514, and a communication component 516.

The processing component 502 usually controls overall operations of the apparatus 500, such as operations relating to display, a telephone call, data communication, a camera operation and a recording operation. The processing component 502 may include one or more processors 520 for executing instructions to complete all or a part of steps of the above method. Further, the processing component 502 may include one or more modules to facilitate interaction between the processing component 502 and other components. For example, the processing component 502 may include a multimedia module to facilitate the interaction between the multimedia component 508 and the processing component 502.

The memory 504 is configured to store different types of data to support operations of the apparatus 500. Examples of such data include instructions, contact data, phonebook data, messages, pictures, videos, and so on for any application or method that operates on the apparatus 500. The memory 504 may be implemented by any type of volatile or non-volatile storage devices or a combination thereof, and the memory 504 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 506 supplies power for different components of the apparatus 500. The power supply component 506 may include a power supply management system, one or more power supplies, and other components associated with generating, managing and distributing power for the apparatus 500.

The multimedia component 508 includes a screen providing an output interface between the apparatus 500 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 508 may include a front camera and/or a rear camera. When the apparatus 500 is in an operation mode, such as a shooting mode or a video mode, the front camera and/or the rear camera may receive external multimedia data.

The audio component 510 is configured to output and/or input an audio signal. For example, the audio component 510 includes a microphone (MIC). When the apparatus 500 is in an operating mode, such as a call mode, a recording mode and a voice recognition mode, the microphone is configured to receive an external audio signal. The received audio signal may be further stored in the memory 504 or sent via the communication component 516. In some examples, the audio component 510 further includes a speaker for outputting an audio signal.

The I/O interface 512 provides an interface between the processing component 502 and a peripheral interface module. The above peripheral interface module may be a keyboard, a click wheel, a button, or the like. These buttons may include but not limited to, a home button, a volume button, a start button and a lock button.

The sensor component 514 includes one or more sensors for providing a state assessment in different aspects for the apparatus 500. For example, the sensor component 514 may detect an on/off state of the apparatus 500 and relative locations of components. For example, the components are a display and a keypad of the apparatus 500. The sensor component 514 may also detect a position change of the apparatus 500 or a component of the apparatus 500, presence or absence of a contact of a user on the apparatus 500, an orientation or acceleration/deceleration of the apparatus 500, and a temperature change of apparatus 500. The sensor component 514 may include a proximity sensor configured to detect presence of a nearby object without any physical touch. The sensor component 514 may further include an optical sensor, such as a CMOS or CCD image sensor used in an imaging application. In some examples, the sensor component 514 may further include an acceleration sensor, a gyroscope sensor, a magnetic sensor, a pressure sensor, or a temperature sensor.

The communication component 516 is configured to facilitate wired or wireless communication between the apparatus 500 and other devices. The apparatus 500 may access a wireless network based on a communication standard, such as WiFi, 4G, or a combination thereof. In an example, the communication component 516 receives a broadcast signal or broadcast related information from an external broadcast management system via a broadcast channel. In an example, the communication component 516 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 500 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk and etc.

FIG. 6 is a flowchart illustrating an exemplary process of video coding in accordance with some implementations of the present disclosure.

In step 602, the processor 520 determines whether a disable flag is present in a PH associated with a picture.

In some examples, the disable flag specifies whether a coding tool is disabled in one or more slices associated with the PH.

In step 604, the processor 520 infers value of the disable flag according to one or more enable flags signaled in SPS of the picture in response to determining that the disable flag is not present in the PH.

In some examples, the processor 520 disables the coding tool in decoding the one or more slices in response to determining that the value of the disable flag equals to 1 and enables the coding tool in decoding the one or more slices in response to determining that the value of the disable flag equals to 0.

In some examples, the coding tool includes at least one of DMVR based inter bi-prediction and BDOF based inter bi-prediction.

In some examples, the processor 520 skips parsing the disable flag in response to determining that one or more reference picture lists indicate that one or more slices associated with the picture are not bi-predictive.

In some examples, the disable flag specifies whether the DMVR based inter bi-prediction is disabled in the one or more slices associated with the PH, the processor 520 disables the coding tool in decoding the one or more slices by disabling the DMVR based inter bi-prediction in decoding the one or more slices, and the processor 520 enables the coding tool in decoding the one or more slices by enabling the DMVR based inter bi-prediction in decoding the one or more slices.

In some examples, the processor 520 infers the value of the disable flag according to the one or more enable flags signaled in the SPS of the picture in response to determining that parsing of the disable flag is skipped by inferring the value of the disable flag to be 0 in response to determining that a first enable flag in the SPS equals to 1 and a second enable flag in the SPS equals to 0.

In some examples, the first enable flag in the SPS specifies whether the DMVR based inter bi-prediction is enabled, the first enable flag equaling to 1 specifies that the DMVR based inter bi-prediction is enabled, and the first enable flag equaling to 0 specifies that the DMVR based inter bi-prediction is disabled.

In some examples, the second enable flag in the SPS specifies whether the disable flag is present in the PH referring to the SPS, the second enable flag equaling to 0 specifies that the disable flag is not present in the PH referring to the SPS, and the second enable flag equaling to 1 specifies that the disable flag is present in the PH referring to the SPS.

In some examples, the processor 520 infers the value of the disable flag according to the one or more enable flags signaled in the SPS of the picture in response to determining that parsing of the disable flag is skipped by inferring the value of the disable flag to be 1 in response to determining that the first enable flag in the SPS equals to 1 and the second enable flag in the SPS equals to 1 and inferring the value of the disable flag to be 1 in response to determining that the first enable flag in the SPS equals to 0.

In some examples, the processor 520 infers the value of the disable flag according to the one or more enable flags signaled in the SPS of the picture in response to determining that parsing of the disable flag is skipped by inferring the disable flag to be 1 in response to determining that the first enable flag in the SPS equals to 0 and the second enable flag in the SPS equals to 0 and inferring the value of the disable flag to be 1 in response to determining that the first enable flag in the SPS equals to 1, the second enable flag in the SPS equals to 1, one or more reference picture lists are signaled in the PH, and a number of reference pictures in a second reference picture list equals to 0. The one or more reference picture lists include a first reference picture list and the second reference picture list.

In some examples, the processor 520 infers the value of the disable flag according to the one or more enable flags signaled in the SPS of the picture in response to determining that parsing of the disable flag is skipped by inferring the value of the disable flag to be 1 in response to determining that the first enable flag in the SPS equals to 0 and inferring the value of the disable flag to be 1 in response to determining that the second enable flag in the SPS equals to 1.

In some examples, the processor 520 determines value of a first enable flag in the SPS as W, and the first enable flag in the SPS specifies whether the DMVR based inter bi-prediction is enabled, the first enable flag equaling to 1 specifies that the DMVR based inter bi-prediction is enabled, and the first enable flag equaling to 0 specifies that the DMVR based inter bi-prediction is disabled. The processor 520 infers the value of the disable flag according to the one or more enable flags signaled in the SPS of the picture in response to determining that parsing of the disable flag is skipped by inferring the value of the disable flag to be 1-W in response to determining that a second enable flag in the SPS equals to 0. The second enable flag in the SPS specifies whether the disable flag is present in the PH referring to the SPS, the second enable flag equaling to 0 specifies that the disable flag is not present in the PH referring to the SPS, and the second enable flag equaling to 1 specifies that the disable flag is present in the PH referring to the SPS.

In some examples, the processor 520 infers the value of the disable flag according to the one or more enable flags signaled in the SPS of the picture in response to determining that parsing of the disable flag is skipped by inferring the value of the disable flag to be 1 in response to determining that the second enable flag in the SPS does not equal to 0.

In some examples, the processor 520 infers the value of the disable flag to be 1 in response to determining that the second enable flag in the SPS does not equal to 0 by inferring the value of the disable flag to be 1 in response to determining that the second enable flag in the SPS equals to 1, one or more reference picture lists are signaled in the PH, and a number of reference pictures in a second reference picture list equals to 0. The one or more reference picture lists includes a first reference picture list and the second reference picture list.

In some examples, the processor 520 infers the value of the disable flag according to the one or more enable flags in the SPS in response to determining that the disable flag is signaled in the PH.

In some examples, the processor 520 infers the value of the disable flag according to the one or more enable flags in the SPS in response to determining that the disable flag is signaled in the PH by: determining a value of a first enable flag in the SPS as W; inferring the value of the disable flag to be 1-W in response to determining that a second enable flag in the SPS equals to 1 and one or more reference picture lists are not signaled in the PH; inferring the value of the disable flag to be 1-W in response to determining that the second enable flag in the SPS equals to 1, the one or more reference picture lists are signaled in the PH, and a number of reference pictures in the reference picture list 1 is greater than 0.

In some examples, the processor 520 infers the value of the disable flag according to the one or more enable flags in the SPS in response to determining that the disable flag is signaled in the PH by: inferring the value of the disable flag to be a value of the disable flag explicitly signaled in the PH in response to determining that a first enable flag in the SPS equals to 1, a second enable flag in the SPS equals to 1, and one or more reference picture lists are not signaled in the PH; inferring the value of the disable flag to be the value of the disable flag explicitly signaled in the PH in response to determining that the first enable flag in the SPS equals to 1, the second enable flag in the SPS equals to 1, the one or more reference picture lists are signaled in the PH, and a number of reference pictures in the reference picture list 1 is greater than 0.

In some examples, the disable flag specifies whether the BDOF based inter bi-prediction is disabled in the one or more slices associated with the PH. The processor 520 disables the coding tool in decoding the one or more slices by disabling the BDOF based inter bi-prediction in decoding the one or more slices and enables the coding tool in decoding the one or more slices by enabling the BDOF based inter bi-prediction in decoding the one or more slices.

In some examples, the processor 520 infers the value of the disable flag according to the one or more enable flags signaled in the SPS of the picture in response to determining that parsing of the disable flag is skipped by inferring the value of the disable flag to be 0 in response to determining that a third enable flag in the SPS equals to 1 and a fourth enable flag in the SPS equals to 0. The third enable flag in the SPS specifies whether the BDOF based inter bi-prediction is enabled, the third enable flag equaling to 1 specifies that the BDOF based inter bi-prediction is enabled, and the third enable flag equaling to 0 specifies that the BDOF based inter bi-prediction is disabled. The fourth enable flag in the SPS specifies whether the disable flag is present in the PH referring to the SPS, the fourth enable flag equaling to 0 specifies that the disable flag is not present in the PH referring to the SPS, and the fourth enable flag equaling to 1 specifies that the disable flag is present in the PH referring to the SPS.

In some examples, the processor 520 infers the value of the disable flag according to the one or more enable flags signaled in the SPS of the picture in response to determining that the parsing of the disable flag is skipped by inferring the value of the disable flag to be 1 in response to determining that the third enable flag in the SPS equals to 1 and the fourth enable flag in the SPS equals to 1 and inferring the value of the disable flag to be 1 in response to determining that the third enable flag in the SPS equals to 0.

In some examples, the processor 520 infers the value of the disable flag according to the one or more enable flags signaled in the SPS of the picture in response to determining that the parsing of the disable flag is skipped by inferring the disable flag to be 1 in response to determining that the third enable flag in the SPS equals to 0 and the fourth enable flag in the SPS equals to 0 and inferring the value of the disable flag to be 1 in response to determining that the third enable flag in the SPS equals to 1, the fourth enable flag in the SPS equals to 1, one or more reference picture lists are signaled in the PH, and a number of reference pictures in a second reference picture list equals to 0. The one or more reference picture lists include a first reference picture list and the second reference picture list.

In some examples, the processor 520 infers the value of the disable flag according to the one or more enable flags signaled in the SPS of the picture in response to determining that the parsing of the disable flag is skipped by inferring the value of the disable flag to be 1 in response to determining that the third enable flag in the SPS equals to 0 and inferring the value of the disable flag to be 1 in response to determining that the fourth enable flag in the SPS equals to 1.

In some examples, the processor 520 determines value of a third enable flag in the SPS as V and infers the value of the disable flag according to the one or more enable flags signaled in the SPS of the picture by inferring the value of the disable flag to be 1-V in response to determining that a fourth enable flag in the SPS equals to 0.

In some examples, the processor 520 infers the value of the disable flag according to the one or more enable flags signaled in the SPS of the picture in response to determining that the parsing of the disable flag is skipped by infers the value of the disable flag to be 1 in response to determining that the fourth enable flag in the SPS does not equal to 0.

In some examples, the processor 520 infers the value of the disable flag to be 1 in response to determining that the fourth enable flag in the SPS does not equal to 0 by inferring the value of the disable flag to be 1 in response to determining that the fourth enable flag in the SPS equals to 1, one or more reference picture lists are signaled in the PH, and a number of reference pictures in a second reference picture list equals to 0. The one or more reference picture lists include a first reference picture list and the second reference picture list.

In some examples, the processor 520 determines a value of a third enable flag in the SPS as V and infers the value of the disable flag according to the one or more enable flags in the SPS in response to determining that the disable flag is signaled in the PH by: inferring the value of the disable flag to be 1-V in response to determining that a fourth enable flag in the SPS equals to 1 and one or more reference picture lists are not signaled in the PH; and inferring the value of the disable flag to be 1-V in response to determining that the fourth enable flag in the SPS equals to 1, the one or more reference picture lists are signaled in the PH, and a number of reference pictures in the reference picture list 1 is greater than 0.

In some examples, the processor 520 infers the value of the disable flag to be a value of the disable flag explicitly signalled in the PH in response to determining that a third enable flag in the SPS equals to 1, a fourth enable flag in the SPS equals to 1, and one or more reference picture lists are not signaled in the PH and infers the value of the disable flag to be the value of the disable flag explicitly signalled in the PH in response to determining that the third enable flag in the SPS equals to 1, the fourth enable flag in the SPS equals to 1, the one or more reference picture lists are signaled in the PH, and a number of reference pictures in the reference picture list 1 is greater than 0.

FIG. 7 is a flowchart illustrating an exemplary process of video coding in accordance with some implementations of the present disclosure.

In step 702, the processor 520 determines whether a flag is present in a PH associated with a picture.

In some examples, the flag specifies whether the picture used for TMVP is derived from a reference picture list from a plurality of reference picture lists associated with the picture.

In step 704, the processor 520 infers value of the flag according to a number of reference pictures in the reference picture list in response to determining that the flag is not present in the PH.

In some examples, the processor 520 skips parsing the flag in response to determining that the plurality of reference picture lists indicate that one or more slices associated with the picture are not bi-predictive.

In some examples, the plurality of reference picture lists include a first reference picture list and a second reference picture list.

In some examples, the flag equaling to 1 specifies that the picture used for TMVP is derived from the first reference picture list, and the flag equaling to 0 specifies that the picture used for TMVP is derived from the second reference picture list.

In some examples, the processor 520 infers the value of the flag according to the number of reference pictures in the reference picture list in response to determining that parsing of the flag is skipped by inferring the value of the flag to be 1 in response to determining that the number of reference pictures in the first reference picture list is greater than 1 and inferring the value of the flag to be 0 in response to determining that the number of reference pictures in the second reference picture list is greater than 1.

FIG. 8 is a flowchart illustrating an exemplary process of video coding in accordance with some implementations of the present disclosure.

In step 802, the processor 520 determines whether a flag is present in a PH associated with a picture.

In some examples, the flag specifies a number of weights signaled in a reference picture list according to a first WP flag in PPS of the picture and a second WP flag in the PH of the picture and the flag is in a WP syntax associated with the picture.

In step 804, the processor 520 infers value of the flag according to a number of reference pictures in a reference picture list from a plurality of reference picture lists associated with the picture in response to determining that the flag is not present in the PH.

In some examples, the processor 520 skips parsing the flag in response to determining that the plurality of reference picture lists indicate that one or more slices associated with the picture are not bi-predictive.

In some examples, the plurality of reference picture lists include a first reference picture list and a second reference picture list, the flag specifies the number of weights signaled in the second reference picture list in response to determining that the first WP flag in the PPS equals to 1 and the second WP flag in the PH equals to 1.

In some examples, the processor 520 infers the value of the flag according to the number of reference pictures in the reference picture list associated with the picture in response to determining that parsing of the flag is skipped by inferring the value of the flag to be 0 in response to determining that the first WP flag in the PPS equals to 0, the second WP flag in the PH equals to 1, and the number of reference pictures in the second reference picture list equals to 0, inferring the value of the flag to be a value of the flag explicitly signaled in the PH in response to determining that the first WP flag in the PPS does not equal to 0 and the second WP flag in the PH equals to 1, and inferring the value of the flag to be a value of NumRefIdxActive[1] in response to determining that the first WP flag in the PPS does not equal to 0 and the second WP flag in the PH does not equal to 1.

In some examples, value of NumRefIdxActive[i]−1 specifies a maximum reference index for a reference picture list i, where i equals to 0 or 1.

For example, value of NumRefIdxActive[1]−1 specifies a maximum reference index for the reference picture list 1, that is, the second reference picture list.

In some examples, the processor 520 determines the value of the flag in response to determining that the flag is present in the PH by determining the value of the flag as 0 in response to determining the first WP flag in the PPS equals to 0, determining the value of the flag to be a value of the flag explicitly signaled in the PH in response to determining the first WP flag in the PPS does not equal to 0 and the second WP flag in the PH equals to 1, and determining the value of the flag to be a value of NumRefIdxActive[1] in response to determining that the first WP flag in the PPS does not equal to 0 and the second WP flag in the PH does not equal to 1.

FIG. 9 is a flowchart illustrating an exemplary process of video coding in accordance with some implementations of the present disclosure.

In step 902, the processor 520 uses an enabled flag to specify whether one or more temporal motion vector predictors used for inter prediction for one or more slices associated with a PH of a picture.

In step 904, the processor 520 constrains value of the enabled flag according to a plurality of offsets applied to a size of the picture for scaling ratio calculation.

In some examples, the processor sets the enabled flag to 0 in response to determining that there is no common reference picture in one or more inter slices. The one or more slices include the one or more inter slices associated with the PH.

In some examples, the processor sets the enabled flag to 0 in response to determining that there is no common reference picture in one or more non-intra slices.

In some examples, there is provided an apparatus for video coding. The apparatus includes one or more processors 520; and a memory 504 configured to store instructions executable by the one or more processors; where the processor, upon execution of the instructions, is configured to perform a method as illustrated in FIG. 6.

In some examples, there is provided an apparatus for video coding. The apparatus includes one or more processors 520; and a memory 504 configured to store instructions executable by the one or more processors; where the processor, upon execution of the instructions, is configured to perform a method as illustrated in FIG. 7.

In some examples, there is provided an apparatus for video coding. The apparatus includes one or more processors 520; and a memory 504 configured to store instructions executable by the one or more processors; where the processor, upon execution of the instructions, is configured to perform a method as illustrated in FIG. 8.

In some examples, there is provided an apparatus for video coding. The apparatus includes one or more processors 520; and a memory 504 configured to store instructions executable by the one or more processors; where the processor, upon execution of the instructions, is configured to perform a method as illustrated in FIG. 9.

In some other examples, there is provided a non-transitory computer readable storage medium 504, having instructions stored therein. When the instructions are executed by one or more processors 520, the instructions cause the processor to perform a method as illustrated in FIG. 6.

In some other examples, there is provided a non-transitory computer readable storage medium 504, having instructions stored therein. When the instructions are executed by one or more processors 520, the instructions cause the processor to perform a method as illustrated in FIG. 7.

In some other examples, there is provided a non-transitory computer readable storage medium 504, having instructions stored therein. When the instructions are executed by one or more processors 520, the instructions cause the processor to perform a method as illustrated in FIG. 8.

In some other examples, there is provided a non-transitory computer readable storage medium 504, having instructions stored therein. When the instructions are executed by one or more processors 520, the instructions cause the processor to perform a method as illustrated in FIG. 9.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for video decoding, comprising:
   determining, by a decoder, whether a disable flag is present in a picture header (PH) associated with a picture, wherein the disable flag specifies whether a coding tool is disabled for one or more slices associated with the PH; and
   in response to determining that the disable flag is not present in the PH, inferring, by the decoder, a value of the disable flag according to one or more enable flags signaled in a sequence parameter set (SPS) of the picture, wherein in response to determining that the disable flag is not present in the PH, inferring the value of the disable flag according to the one or more enable flags signaled in the SPS of the picture comprises:
      in response to determining that a first enable flag in the SPS equals to 1 and a second enable flag in the SPS equals to 0, inferring the value of the disable flag to be 0.

2. The method of claim 1, further comprising:
   in response to determining that the value of the disable flag equals to 1, disabling, by the decoder, the coding tool in decoding the one or more slices; and
   in response to determining that the value of the disable flag equals to 0, enabling, by the decoder, the coding tool in decoding the one or more slices.

3. The method of claim 1, wherein the coding tool comprises at least one of decoder motion vector refinement (DMVR) based inter bi-prediction and bi-directional optical flow (BDOF) based inter bi-prediction.

4. The method of claim 3, further comprising:
   in response to determining from one or more reference picture lists that the one or more slices associated with the picture are not bi-predictive, determining, by the decoder, that the disable flag is not present in the PH.

5. The method of claim 4, wherein the disable flag specifies whether the DMVR based inter bi-prediction is disabled for the one or more slices associated with the PH;
   wherein disabling the coding tool in decoding the one or more slices comprises disabling the DMVR based inter bi-prediction in decoding the one or more slices; and
   wherein enabling the coding tool in decoding the one or more slices comprises enabling the DMVR based inter bi-prediction in decoding the one or more slices.

6. The method of claim 5, wherein in response to determining that the disable flag is not present in the PH, inferring the value of the disable flag according to the one or more enable flags signaled in the SPS of the picture further comprises:
   in response to determining that the first enable flag in the SPS equals to 1 and the second enable flag in the SPS equals to 1, inferring the value of the disable flag to be 1; and
   in response to determining that the first enable flag in the SPS equals to 0, inferring the value of the disable flag to be 1.

7. The method of claim 6, further comprising:
   in response to determining that the one or more reference picture lists are signaled in the PH, and a number of reference pictures in a second reference picture list equals to 0, determining that the one or more slices associated with the picture are not bi-predictive, wherein the one or more reference picture lists comprise a first reference picture list and the second reference picture list,
   wherein in response to determining that the disable flag is not present in the PH, inferring the value of the disable flag according to the one or more enable flags signaled in the SPS of the picture further comprises:
      in response to determining that the first enable flag in the SPS equals to 0 and the second enable flag in the SPS equals to 0, inferring the disable flag to be 1; and
      in response to determining that the first enable flag in the SPS equals to 1 and the second enable flag in the SPS equals to 1, inferring the value of the disable flag to be 1.

8. The method of claim 6, wherein in response to determining that the disable flag is not present in the PH, inferring the value of the disable flag according to the one or more enable flags signaled in the SPS of the picture further comprises:
   in response to determining that the first enable flag in the SPS equals to 0, inferring the value of the disable flag to be 1; and
   in response to determining that the second enable flag in the SPS equals to 1, inferring the value of the disable flag to be 1.

9. The method of claim 5, further comprising:
   determining a value of the first enable flag in the SPS as W; and
   wherein in response to determining that the disable flag is not present in the PH, inferring the value of the disable flag according to the one or more enable flags signaled in the SPS of the picture further comprises:
      in response to determining that a second enable flag in the SPS equals to 0, inferring the value of the disable flag to be 1-W.

10. The method of claim 9, wherein in response to determining that the disable flag is not present in the PH, inferring the value of the disable flag according to the one or more enable flags signaled in the SPS of the picture further comprises:
    in response to determining that the second enable flag in the SPS does not equal to 0, inferring the value of the disable flag to be 1.

11. The method of claim 10, further comprising:
    in response to determining that the one or more reference picture lists are signaled in the PH, and a number of reference pictures in a second reference picture list equals to 0, determining that the one or more slices associated with the picture are not bi-predictive, wherein the one or more reference picture lists comprise a first reference picture list and the second reference picture list,
    wherein in response to determining that the second enable flag in the SPS does not equal to 0, inferring the value of the disable flag to be 1 further comprises:
       in response to determining that the second enable flag in the SPS equals to 1, inferring the value of the disable flag to be 1.

12. The method of claim 4, wherein the disable flag specifies whether the BDOF based inter bi-prediction is disabled for the one or more slices associated with the PH;
    wherein disabling the coding tool in decoding the one or more slices comprises disabling the BDOF based inter bi-prediction in decoding the one or more slices; and
    wherein enabling the coding tool in decoding the one or more slices comprises enabling the BDOF based inter bi-prediction in decoding the one or more slices.

13. The method of claim 12, wherein in response to determining that the disable flag is not present in the PH, inferring the value of the disable flag according to the one or more enable flags signaled in the SPS of the picture further comprises:
in response to determining that the first enable flag in the SPS equals to 1 and the second enable flag in the SPS equals to 1, inferring the value of the disable flag to be 1; and
in response to determining that the first enable flag in the SPS equals to 0, inferring the value of the disable flag to be 1.

14. The method of claim 13, further comprising:
in response to determining that the one or more reference picture lists are signaled in the PH, and a number of reference pictures in a second reference picture list equals to 0, determining that the one or more slices associated with the picture are not bi-predictive, wherein the one or more reference picture lists comprise a first reference picture list and the second reference picture list,
wherein in response to determining that the disable flag is not present in the PH, inferring the value of the disable flag according to the one or more enable flags signaled in the SPS of the picture further comprises:
in response to determining that the first enable flag in the SPS equals to 0 and the second enable flag in the SPS equals to 0, inferring the value of the disable flag to be 1; and
in response to determining that the first enable flag in the SPS equals to 1, and the second enable flag in the SPS equals to 1, inferring the value of the disable flag to be 1.

15. The method of claim 13, wherein in response to determining that the disable flag is not present in the PH, inferring the value of the disable flag according to the one or more enable flags signaled in the SPS of the picture further comprises:
in response to determining that the first enable flag in the SPS equals to 0, inferring the value of the disable flag to be 1; and
in response to determining that the fourth second enable flag in the SPS equals to 1, inferring the value of the disable flag to be 1.

16. The method of claim 12, further comprising:
determining a value of the first enable flag in the SPS as V
wherein inferring the value of the disable flag according to the one or more enable flags signaled in the SPS of the picture further comprises:
in response to determining that the second enable flag in the SPS equals to 0, inferring the value of the disable flag to be 1-V.

17. The method of claim 16, wherein in response to determining that the disable flag is not present in the PH, inferring the value of the disable flag according to the one or more enable flags signaled in the SPS of the picture further comprises:
in response to determining that the second enable flag in the SPS does not equal to 0, inferring the value of the disable flag to be 1.

18. The method of claim 1, wherein the first enable flag in the SPS specifies whether the coding tool is enabled, the first enable flag equaling to 1 specifies that the coding tool is enabled, and the first enable flag equaling to 0 specifies that the coding tool is disabled, and
wherein the second enable flag in the SPS specifies whether the disable flag is present in the PH referring to the SPS, the second enable flag equaling to 0 specifies that the disable flag is not present in the PH referring to the SPS, and the second enable flag equaling to 1 specifies that the disable flag is able to be present in the PH referring to the SPS.

19. An apparatus for video coding, comprising:
one or more processors; and
a memory configured to store instructions executable by the one or more processors;
wherein the one or more processors, upon execution of the instructions, are configured to perform the method for video decoding comprising:
determining whether a disable flag is present in a picture header (PH) associated with a picture, wherein the disable flag specifies whether a coding tool is disabled for one or more slices associated with the PH; and
in response to determining that the disable flag is not present in the PH, inferring a value of the disable flag according to one or more enable flags signaled in a sequence parameter set (SPS) of the picture,
wherein in response to determining that the disable flag is not present in the PH, inferring the value of the disable flag according to the one or more enable flags signaled in the SPS of the picture comprises:
in response to determining that a first enable flag in the SPS equals to 1 and a second enable flag in the SPS equals to 0, inferring the value of the disable flag to be 0.

20. A non-transitory computer-readable storage medium for video coding storing a bitstream to be decoded by a method for video decoding, comprising:
determining whether a disable flag is present in a picture header (PH) associated with a picture, wherein the disable flag specifies whether a coding tool is disabled for one or more slices associated with the PH; and
in response to determining that the disable flag is not present in the PH, inferring a value of the disable flag according to one or more enable flags signaled in a sequence parameter set (SPS) of the picture;
wherein in response to determining that the disable flag is not present in the PH, inferring the value of the disable flag according to the one or more enable flags signaled in the SPS of the picture comprises:
in response to determining that a first enable flag in the SPS equals to 1 and a second enable flag in the SPS equals to 0, inferring the value of the disable flag to be 0.

* * * * *